: US 9,906,144 B2
(45) Date of Patent: Feb. 27, 2018

(12) United States Patent
Zhang et al.

(10) Patent No.: US 9,906,144 B2
(45) Date of Patent: Feb. 27, 2018

(54) SYSTEMS AND METHODS FOR PROTECTING POWER CONVERSION SYSTEMS FROM THERMAL RUNAWAY

(71) Applicant: ON-BRIGHT ELECTRONICS (SHANGHAI) CO., LTD., Shanghai (CN)

(72) Inventors: Yunchao Zhang, Shanghai (CN); Xiuhong Zhang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/040,674

(22) Filed: Feb. 10, 2016

(65) Prior Publication Data

US 2016/0218631 A1 Jul. 28, 2016

Related U.S. Application Data

(63) Continuation of application No. 14/151,209, filed on Jan. 9, 2014, now Pat. No. 9,325,234.

(30) Foreign Application Priority Data

Dec. 6, 2013 (CN) .......................... 2013 1 0656906

(51) Int. Cl.
*H02M 3/335* (2006.01)
*H02M 1/32* (2007.01)
(Continued)

(52) U.S. Cl.
CPC ......... *H02M 3/33515* (2013.01); *H02M 1/08* (2013.01); *H02M 1/32* (2013.01);
(Continued)

(58) Field of Classification Search
CPC ........... H02M 2001/0009; H02M 1/32; H02M 3/33507; H02M 3/33523
(Continued)

(56) References Cited

U.S. PATENT DOCUMENTS 3,912,340 A 10/1975 Bertolasi
5,247,241 A 9/1993 Ueda
(Continued)

FOREIGN PATENT DOCUMENTS

CN 1841893 A 10/2006
CN 1917322 A 2/2007
(Continued)

OTHER PUBLICATIONS

U.S., Office Action dated Nov. 22, 2016, in U.S. Appl. No. 13/646,268.
(Continued)

*Primary Examiner* — Adolf Berhane
*Assistant Examiner* — Afework Demisse
(74) *Attorney, Agent, or Firm* — Jones Day

(57) ABSTRACT

System and method for protecting a power conversion system. An example system controller includes a protection component and a driving component. The protection component is configured to receive a feedback signal, a reference signal, and a demagnetization signal generated based on at least information associated with the feedback signal, process information associated with the feedback signal, the reference signal, and the demagnetization signal, and generate a protection signal based on at least information associated with the feedback signal, the reference signal, and the demagnetization signal. The demagnetization signal is related to multiple demagnetization periods of the power conversion system, the multiple demagnetization periods including a first demagnetization period and a second
(Continued)

demagnetization period. The driving component is configured to receive the protection signal and output a drive signal to a switch configured to affect a current flowing through a primary winding of the power conversion system.

45 Claims, 10 Drawing Sheets

(51) Int. Cl.
  *H02M 1/08* (2006.01)
  *H02M 1/00* (2006.01)
(52) U.S. Cl.
  CPC ............... *H02M 3/33507* (2013.01); *H02M 2001/0009* (2013.01); *H02M 2001/327* (2013.01)
(58) Field of Classification Search
  USPC ... 363/21.01, 21.16, 50, 55, 56, 56.09–56.11
  See application file for complete search history.

(56) References Cited

U.S. PATENT DOCUMENTS

| | | |
|---|---|---|
| 5,497,119 A | 3/1996 | Tedrow et al. |
| 5,568,044 A | 10/1996 | Bittner |
| 5,729,448 A | 3/1998 | Haynie et al. |
| 6,134,060 A | 10/2000 | Ryat |
| 6,292,376 B1 | 9/2001 | Kato |
| 6,366,066 B1 | 4/2002 | Wilcox |
| 6,366,070 B1 | 4/2002 | Cooke et al. |
| 6,381,151 B1 | 4/2002 | Jang |
| 6,545,513 B2 | 4/2003 | Tsuchida et al. |
| 6,556,478 B2 | 4/2003 | Willis et al. |
| 6,713,995 B2 | 3/2004 | Chen |
| 6,798,086 B2 | 9/2004 | Utsunomiya |
| 6,947,298 B2 | 9/2005 | Uchida |
| 6,954,056 B2 | 10/2005 | Hoshino et al. |
| 6,972,528 B2 | 12/2005 | Shao |
| 6,972,548 B2 | 12/2005 | Tzeng et al. |
| 6,977,824 B1 | 12/2005 | Yang et al. |
| 7,035,119 B2 | 4/2006 | Koike |
| 7,054,169 B2 | 5/2006 | Huh et al. |
| 7,116,089 B1 | 10/2006 | Nguyen et al. |
| 7,173,404 B2 | 2/2007 | Wu |
| 7,208,927 B1 | 4/2007 | Nguyen |
| 7,262,587 B2 | 8/2007 | Takimoto et al. |
| 7,265,999 B2 | 9/2007 | Murata et al. |
| 7,345,895 B2 | 3/2008 | Zhu et al. |
| 7,394,634 B2 | 7/2008 | Fang et al. |
| 7,414,865 B2 | 8/2008 | Yang |
| 7,456,623 B2 | 11/2008 | Hasegawa et al. |
| 7,492,619 B2 | 2/2009 | Ye et al. |
| 7,522,431 B2 | 4/2009 | Huynh et al. |
| 7,605,576 B2 | 10/2009 | Kanakubo |
| 7,609,039 B2 | 10/2009 | Hasegawa |
| 7,684,220 B2 | 3/2010 | Fang et al. |
| 7,684,462 B2 | 3/2010 | Ye et al. |
| 7,826,237 B2 | 11/2010 | Zhang et al. |
| 7,852,055 B2 | 12/2010 | Michishita |
| 7,898,825 B2 | 3/2011 | Mulligan et al. |
| 7,990,202 B2 | 8/2011 | Fang et al. |
| 8,085,027 B2 | 12/2011 | Lin et al. |
| 8,213,203 B2 | 7/2012 | Fei et al. |
| 8,305,776 B2 | 11/2012 | Fang |
| 8,331,112 B2 | 12/2012 | Huang et al. |
| 8,339,814 B2 | 12/2012 | Zhang et al. |
| 8,391,028 B2 | 3/2013 | Yeh |
| 8,488,342 B2 | 7/2013 | Zhang et al. |
| 8,526,203 B2 | 9/2013 | Huang et al. |
| 8,879,289 B2 | 11/2014 | Lin et al. |
| 8,891,256 B2 | 11/2014 | Fang et al. |
| 8,971,062 B2 | 3/2015 | Huang et al. |
| 8,982,585 B2 | 3/2015 | Fang |
| 9,088,217 B2 | 7/2015 | Zhang et al. |
| 9,325,234 B2 * | 4/2016 | Zhang .................. H02M 1/32 |
| 9,350,252 B2 | 5/2016 | Zhang et al. |
| 9,379,623 B2 | 6/2016 | Zhang et al. |
| 9,379,624 B2 | 6/2016 | Lin et al. |
| 9,385,612 B2 | 7/2016 | Zhang et al. |
| 9,559,598 B2 | 1/2017 | Fang et al. |
| 9,577,537 B2 | 2/2017 | Zhang et al. |
| 2002/0080625 A1 | 6/2002 | Goyhenetche et al. |
| 2002/0080631 A1 | 6/2002 | Kanouda et al. |
| 2003/0174520 A1 | 9/2003 | Bimbaud |
| 2004/0075600 A1 | 4/2004 | Vera et al. |
| 2005/0057238 A1 | 3/2005 | Yoshida |
| 2005/0116697 A1 | 6/2005 | Matsuo et al. |
| 2005/0222646 A1 | 10/2005 | Kroll et al. |
| 2005/0270807 A1 | 12/2005 | Strijker |
| 2006/0034102 A1 | 2/2006 | Yang et al. |
| 2006/0043953 A1 | 3/2006 | Xu |
| 2006/0050539 A1 | 3/2006 | Yang et al. |
| 2006/0055433 A1 | 3/2006 | Yang et al. |
| 2006/0273772 A1 | 12/2006 | Groom |
| 2007/0115696 A1 | 5/2007 | Berghegger |
| 2007/0171687 A1 | 7/2007 | Kogel et al. |
| 2007/0241733 A1 | 10/2007 | Chen et al. |
| 2007/0273345 A1 | 11/2007 | Chen et al. |
| 2008/0061754 A1 | 3/2008 | Hibi |
| 2008/0112193 A1 | 5/2008 | Yan et al. |
| 2008/0157742 A1 | 7/2008 | Martin et al. |
| 2008/0159378 A1 | 7/2008 | Kris |
| 2008/0225563 A1 | 9/2008 | Seo |
| 2008/0252345 A1 | 10/2008 | Deschamp et al. |
| 2009/0051336 A1 | 2/2009 | Hartlieb et al. |
| 2009/0058387 A1 | 3/2009 | Huynh et al. |
| 2009/0073727 A1 | 3/2009 | Huynh et al. |
| 2009/0121697 A1 | 5/2009 | Aiura et al. |
| 2009/0141520 A1 | 6/2009 | Grande et al. |
| 2009/0175057 A1 | 7/2009 | Grande et al. |
| 2009/0206814 A1 | 8/2009 | Zhang et al. |
| 2009/0219000 A1 | 9/2009 | Yang |
| 2009/0251219 A1 | 10/2009 | Fiocchi et al. |
| 2009/0302817 A1 | 12/2009 | Nagai |
| 2010/0026270 A1 | 2/2010 | Yang et al. |
| 2010/0061126 A1 | 3/2010 | Huynh et al. |
| 2010/0128501 A1 | 5/2010 | Huang et al. |
| 2010/0141178 A1 | 6/2010 | Negrete et al. |
| 2010/0219802 A1 | 9/2010 | Lin et al. |
| 2010/0225293 A1 | 9/2010 | Wang et al. |
| 2011/0044076 A1 | 2/2011 | Zhang et al. |
| 2011/0096574 A1 | 4/2011 | Huang |
| 2011/0149614 A1 | 6/2011 | Stracquadaini |
| 2011/0182089 A1 | 7/2011 | genannt Berghegger |
| 2011/0248770 A1 | 10/2011 | Fang et al. |
| 2011/0267853 A1 * | 11/2011 | Yang .................. H02M 1/32 363/56.01 |
| 2012/0013321 A1 | 1/2012 | Huang et al. |
| 2012/0075891 A1 | 3/2012 | Zhang et al. |
| 2012/0139435 A1 | 6/2012 | Storm |
| 2012/0147630 A1 | 6/2012 | Cao et al. |
| 2012/0153919 A1 | 6/2012 | Garbossa et al. |
| 2012/0195076 A1 | 8/2012 | Zhang et al. |
| 2012/0224397 A1 | 9/2012 | Yeh |
| 2012/0257423 A1 | 10/2012 | Fang |
| 2012/0281438 A1 | 11/2012 | Fang et al. |
| 2012/0300508 A1 | 11/2012 | Fang |
| 2012/0320640 A1 | 12/2012 | Baurle et al. |
| 2013/0027989 A1 | 1/2013 | Fang |
| 2013/0033905 A1 | 2/2013 | Lin et al. |
| 2013/0051090 A1 | 2/2013 | Xie et al. |
| 2013/0182476 A1 | 7/2013 | Yang et al. |
| 2013/0223107 A1 | 8/2013 | Zhang et al. |
| 2013/0272033 A1 | 10/2013 | Zhang et al. |
| 2013/0308350 A1 | 11/2013 | Huang et al. |
| 2014/0078790 A1 | 3/2014 | Lin et al. |
| 2014/0160809 A1 | 6/2014 | Lin et al. |
| 2014/0268920 A1 | 9/2014 | Fang et al. |
| 2015/0055378 A1 | 2/2015 | Lin et al. |
| 2015/0162820 A1 | 6/2015 | Zhang et al. |
| 2015/0180347 A1 | 6/2015 | Fang et al. |
| 2015/0295499 A1 | 10/2015 | Zhang et al. |
| 2015/0311804 A1 | 10/2015 | Fang |

(56) References Cited

U.S. PATENT DOCUMENTS

| | | | |
|---|---|---|---|
| 2016/0028318 | A1 | 1/2016 | Fang et al. |
| 2016/0315543 | A1 | 10/2016 | Zhang et al. |
| 2016/0329818 | A1 | 11/2016 | Lin et al. |
| 2016/0329821 | A1 | 11/2016 | Zhang et al. |
| 2016/0354792 | A1 | 12/2016 | Zhang et al. |
| 2017/0187293 | A1 | 6/2017 | Fang et al. |

FOREIGN PATENT DOCUMENTS

| | | | |
|---|---|---|---|
| CN | 1929274 | A | 3/2007 |
| CN | 1964172 | A | 5/2007 |
| CN | 1988347 | A | 6/2007 |
| CN | 101034851 | A | 9/2007 |
| CN | 101039077 | A | 9/2007 |
| CN | 101079576 | A | 11/2007 |
| CN | 101127495 | A | 2/2008 |
| CN | 101247083 | A | 8/2008 |
| CN | 101295872 | A | 10/2008 |
| CN | 101350562 | A | 1/2009 |
| CN | 101515756 | A | 8/2009 |
| CN | 101552560 | A | 10/2009 |
| CN | 101577468 | A | 11/2009 |
| CN | 101577488 | A | 11/2009 |
| CN | 101826796 | A | 9/2010 |
| CN | 101515756 | B | 11/2011 |
| CN | 102332826 | A | 1/2012 |
| CN | 102474964 | A | 5/2012 |
| CN | 102624237 | A | 8/2012 |
| CN | 102651613 | A | 8/2012 |
| CN | 102709880 | A | 10/2012 |
| CN | 102723945 | A | 10/2012 |
| CN | 102983760 | A | 3/2013 |
| CN | 103166198 | A | 6/2013 |
| CN | 103296904 | A | 9/2013 |
| TW | 200840174 | A | 10/2008 |
| TW | 200937157 | A | 9/2009 |
| TW | I 437808 | | 5/2014 |
| TW | I 448060 | | 8/2014 |

OTHER PUBLICATIONS

U.S., Notice of Allowance dated Sep. 22, 2016, in U.S. Appl. No. 14/293,280.
U.S., Notice of Allowance dated Oct. 21, 2016, in U.S. Appl. No. 14/684,047.
U.S., Notice of Allowance dated Oct. 13, 2016, in U.S. Appl. No. 14/488,176.
U.S., Office Action dated Nov. 2, 2016, in U.S. Appl. No. 14/824,018.
Chinese Patent Office, Office Action dated Dec. 8, 2014, in Application No. 201110034669.9.
Chinese Patent Office, Office Action dated Jun. 4, 2014, in Application No. 201110144768.2.
Chinese Patent Office, Office Action dated Nov. 12, 2013, in Application No. 201110051423.2.
Chinese Patent Office, Office Action dated Nov. 14, 2013, in Application No. 201110224933.5.
Chinese Patent Office, Office Action dated Nov. 5, 2013, in Application No. 201210529679.4.
Chinese Patent Office, Office Action dated Dec. 4, 2015, in Application No. 201410226277.6.
Chinese Patent Office, Office Action dated Nov. 5, 2013, in Application No. 201310078547.9.
Chinese Patent Office, Office Action dated Nov. 25, 2015, in Application No. 201310656906.4.
Chinese Patent Office, Office Action dated Nov. 7, 2013, in Application No. 201210342097.5.
Taiwan Patent Office, Office Action dated Mar. 3, 2014, in Application No. 100127088.
Taiwan Patent Office, Office Action dated May 6, 2015, in Application No. 102116550.
Taiwan Patent Office, Office Action dated Oct. 1, 2014, in Application No. 102116551.
Taiwan Patent Office, Office Action dated Oct. 16, 2015, in Application No. 102116550.
Taiwan Patent Office, Office Action dated Oct. 6, 2014, in Application No. 102115002.
U.S., Notice of Allowance dated Aug. 7, 2015, in U.S. Appl. No. 14/151,209.
U.S., Notice of Allowance dated Nov. 16, 2015, in U.S. Appl. No. 14/151,209.
U.S., Notice of Allowance dated Jan. 20, 2015, in U.S. Appl. No. 12/859,138.
U.S., Notice of Allowance dated Jul. 30, 2014, in U.S. Appl. No. 12/859,138.
U.S., Notice of Allowance dated Jun. 22, 2015, in U.S. Appl. No. 13/052,869.
U.S., Notice of Allowance dated Oct. 2, 2015, in U.S. Appl. No. 13/052,869.
U.S., Notice of Allowance dated Jan. 8, 2016, in U.S. Appl. No. 13/052,869.
U.S., Notice of Allowance dated Oct. 2, 2015, in U.S. Appl. No. 13/722,788.
U.S., Notice of Allowance dated Feb. 1, 2016, in U.S. Appl. No. 13/722,788.
U.S., Notice of Allowance dated Oct. 5, 2015, in U.S. Appl. No. 13/915,477.
U.S., Notice of Allowance dated Feb. 22, 2016, in U.S. Appl. No. 13/915,477.
U.S., Notice of Allowance dated Sep. 30, 2015, in U.S. Appl. No. 13/857,836.
U.S., Office Action dated Apr. 1, 2014, in U.S. Appl. No. 13/052,869.
U.S., Office Action dated Aug. 20, 2015, in U.S. Appl. No. 13/646,268.
U.S., Office Action dated Dec. 5, 2012, in U.S. Appl. No. 12/859,138.
U.S., Office Action dated Feb. 15, 2013, in U.S. Appl. No. 13/052,869.
U.S., Office Action dated Feb. 24, 2015, in U.S. Appl. No. 13/722,788.
U.S., Office Action dated Jul. 31, 2013, in U.S. Appl. No. 12/859,138.
U.S., Office Action dated Mar. 12, 2015, in U.S. Appl. No. 13/857,836.
U.S., Notice of Allowance dated Feb. 10, 2016, in U.S. Appl. No. 13/857,836.
U.S., Office Action dated Mar. 12, 2015, in U.S. Appl. No. 13/915,477.
U.S., Office Action dated Nov. 5, 2014, in U.S. Appl. No. 13/052,869.
U.S., Office Action dated Oct. 1, 2013, in U.S. Appl. No. 13/052,869.
U.S., Office Action dated Mar. 7, 2016, in U.S. Appl. No. 14/293,280.
U.S., Corrected Notice of Allowability dated May 26, 2016, in U.S. Appl. No. 13/052,869.
U.S., Office Action dated May 17, 2016, in U.S. Appl. No. 13/646,268.
U.S., Notice of Allowance dated Apr. 21, 2016, in U.S. Appl. No. 14/684,047.
U.S., Office Action dated Apr. 20, 2016, in U.S. Appl. No. 14/488,176.
U.S., Office Action dated Mar. 7, 2017, in U.S. Appl. No. 15/099,419.
United States Patent and Trademark Office, Office Action dated May 26, 2017, in U.S. Appl. No. 15/081,523.
United States Patent and Trademark Office, Office Action dated Mar. 22, 2017, in U.S. Appl. No. 15/152,362.
United States Patent and Trademark Office, Office Action dated Mar. 30, 2017, in U.S. Appl. No. 15/376,290.
United States Patent and Trademark Office, Notice of Allowance dated Jul. 26, 2017, in U.S. Appl. No. 13/646,268.

(56) References Cited

OTHER PUBLICATIONS

United States Patent and Trademark Office, Office Action dated Jun. 30, 2017, in U.S. Appl. No. 14/824,018.
United States Patent and Trademark Office, Office Action dated Aug. 8, 2017, in U.S. Appl. No. 15/376,290.
United States Patent and Trademark Office, Notice of Allowance dated Nov. 14, 2017, in U.S. Appl. No. 14/824,018.
United States Patent and Trademark Office, Notice of Allowance dated Dec. 1, 2017, in U.S. Appl. No. 15/081,523.
United States Patent and Trademark Office, Office Action dated Dec. 18, 2017, in U.S. Appl. No. 15/152,362.
United States Patent and Trademark Office, Notice of Allowance dated Nov. 17, 2017, in U.S. Appl. No. 15/376,290.
United States Patent and Trademark Office, Notice of Allowance dated Sep. 19, 2017, in U.S. Appl. No. 13/646,268.
United States Patent and Trademark Office, Office Action dated Aug. 29, 2017, in U.S. Appl. No. 15/098,002.
United States Patent and Trademark Office, Office Action dated Oct. 4, 2017, in U.S. Appl. No. 15/099,419.

\* cited by examiner

SYSTEMS AND METHODS FOR PROTECTING POWER CONVERSION SYSTEMS FROM THERMAL RUNAWAY

1. CROSS-REFERENCES TO RELATED APPLICATIONS

This application is a continuation of U.S. patent application Ser. No. 14/151,209, filed Jan. 9, 2014, which claims priority to Chinese Patent Application No. 201310656906.4, filed Dec.6, 2013, both of the above-referenced applications being commonly assigned and incorporated by reference herein for all purposes.

This application is related to U.S. patent application Ser. Nos. 13/857,836, 13/071,384, 12/581,775, and 12/502,866, incorporated by reference herein for all purposes.

2. BACKGROUND OF THE INVENTION

Certain embodiments of the present invention are directed to integrated circuits. More particularly, some embodiments of the invention provide a system and method for protecting one or more circuit components. Merely by way of example, some embodiments of the invention have been applied to power conversion systems. But it would be recognized that the invention has a much broader range of applicability.

Schottky rectifying diodes with low forward voltages are often used in power conversion systems to improve system efficiency. Generally, a conventional power conversion system often uses a transformer to isolate the input voltage on the primary side and the output voltage on the secondary side. To regulate the output voltage, certain components, such as TL431 and an opto-coupler, can be used to transmit a feedback signal from the secondary side to a controller chip on the primary side. Alternatively, the output voltage on the secondary side can be imaged to the primary side, so the output voltage is controlled by directly adjusting some parameters on the primary side. Then, some components, such as TL431 and an opto-coupler, can be omitted to reduce the system costs.

FIG. 1 is a simplified diagram showing a conventional flyback power conversion system with primary-side sensing and regulation. The power conversion system 100 includes a primary winding 110, a secondary winding 112, an auxiliary winding 114, a power switch 120, a current sensing resistor 130, an equivalent resistor 140 for an output cable, resistors 150 and 152, and a Schottky rectifying diode 160. For example, the power switch 120 is a bipolar junction transistor. In another example, the power switch 120 is a MOS transistor.

To regulate the output voltage within a predetermined range, information related to the output voltage and the output loading often needs to be extracted. For example, when the power conversion system 100 operates in a discontinuous conduction mode (DCM), such information can be extracted through the auxiliary winding 114. When the power switch 120 is turned on, the energy is stored in the secondary winding 112. Then, when the power switch 120 is turned off, the stored energy is released to the output terminal during a demagnetization process. The voltage of the auxiliary winding 114 maps the output voltage on the secondary side as shown below.

$$V_{FB} = \frac{R_2}{R_1 + R_2} \times V_{aux} = k \times n \times (V_0 + V_F + I_0 \times R_{eq}) \quad \text{(Equation 1)}$$

where $V_{FB}$ represents a voltage at a node 154, and $V_{aux}$ represents the voltage of the auxiliary winding 114. $R_1$ and $R_2$ represent the resistance values of the resistors 150 and 152 respectively. Additionally, n represents a turns ratio between the auxiliary winding 114 and the secondary winding 112. Specifically, n is equal to the number of turns of the auxiliary winding 114 divided by the number of turns of the secondary winding 112. $V_o$ and $I_o$ represent the output voltage and the output current respectively. Moreover, $V_F$ represents the forward voltage of the rectifying diode 160, and $R_{eq}$ represents the resistance value of the equivalent resistor 140. Also, k represents a feedback coefficient as shown below:

$$k = \frac{R_2}{R_1 + R_2} \quad \text{(Equation 2)}$$

FIG. 2 is a simplified diagram showing a conventional operation mechanism for the flyback power conversion system 100. As shown in FIG. 2, the controller chip of the conversion system 100 uses a sample-and-hold mechanism. When the demagnetization process on the secondary side is almost completed and the current $I_{sec}$ of the secondary winding 112 almost becomes zero, the voltage $V_{aux}$ of the auxiliary winding 114 is sampled at, for example, point A of FIG. 2. The sampled voltage value is usually held until the next voltage sampling is performed. Through a negative feedback loop, the sampled voltage value can become equal to a reference voltage $V_{ref}$. Therefore, $$V_{FB} = V_{ref} \quad \text{(Equation 3)}$$

Combining Equations 1 and 3, the following can be obtained:

$$V_0 = \frac{V_{ref}}{k \times n} - V_F - I_0 \times R_{eq} \quad \text{(Equation 4)}$$

Based on Equation 4, the output voltage decreases with the increasing output current.

But thermal runaway may occur in the Schottky diode 160 if the temperature of the diode 160 exceeds a threshold, and a reverse leakage current increases in magnitude drastically. If the output load of the power conversion system 100 is reduced, the reverse leakage current continues to increase in magnitude and the temperature of the diode 160 does not decrease. As such, once the thermal runaway occurs in the Schottky diode 160, the temperature of the diode 160 keeps higher than a normal operating temperature even if the output load is reduced, which may cause safety problems. For example, the outer shell of the power conversion system 100 may be melted due to the high temperature of the Schottky diode 160.

Hence it is highly desirable to improve the techniques of system protection.

3. BRIEF SUMMARY OF THE INVENTION

Certain embodiments of the present invention are directed to integrated circuits. More particularly, some embodiments of the invention provide a system and method for protecting one or more circuit components. Merely by way of example, some embodiments of the invention have been applied to power conversion systems. But it would be recognized that the invention has a much broader range of applicability.

According to one embodiment, a system controller for protecting a power conversion system includes a protection component and a driving component. The protection component is configured to receive a feedback signal, a reference signal, and a demagnetization signal generated based on at least information associated with the feedback signal, process information associated with the feedback signal, the reference signal, and the demagnetization signal, and generate a protection signal based on at least information associated with the feedback signal, the reference signal, and the demagnetization signal. The demagnetization signal is related to multiple demagnetization periods of the power conversion system, the multiple demagnetization periods including a first demagnetization period and a second demagnetization period. The driving component is configured to receive the protection signal and output a drive signal to a switch configured to affect a current flowing through a primary winding of the power conversion system. The protection component is further configured to: process information associated with the feedback signal and the reference signal during a first detection period, the first detection period including a first starting time and a first ending time, the first starting time being at or after a first demagnetization end of the first demagnetization period, determine, during the first detection period, a first number of times that the feedback signal changes from being smaller than the reference signal to being larger than the reference signal in magnitude, and determine whether the first number of times exceeds a predetermined threshold at the first ending time. The protection component and the driving component are further configured to, in response to the first number of times not exceeding the predetermined threshold at the first ending time, output the drive signal to cause the switch to open and remain open in order to protect the power conversion system.

According to another embodiment, a system controller for protecting a power conversion system includes a protection component and a driving component. The protection component is configured to receive a feedback signal, a reference signal, and a demagnetization signal generated based on at least information associated with the feedback signal, process information associated with the feedback signal, the reference signal, and the demagnetization signal, and generate a protection signal based on at least information associated with the feedback signal, the reference signal, and the demagnetization signal. The demagnetization signal is related to multiple demagnetization periods of the power conversion system, the multiple demagnetization periods including a first demagnetization period and a second demagnetization period. The driving component is configured to receive the protection signal and output a drive signal to a switch configured to affect a current flowing through a primary winding of the power conversion system. The protection component is further configured to: process information associated with the feedback signal and the reference signal during a first detection period, the first detection period including a first starting time and a first ending time, the first starting time being at or after a first demagnetization end of the first demagnetization period, determine, during the first detection period, a first number of times that the feedback signal changes from being larger than the reference signal to being smaller than the reference signal in magnitude, and determine whether the first number of times exceeds a predetermined threshold at the first ending time. The protection component and the driving component are further configured to, in response to the first number of times not exceeding the predetermined threshold at the first ending time, output the drive signal to cause the switch to open and remain open in order to protect the power conversion system.

According to yet another embodiment, a method for protecting a power conversion system includes: receiving a feedback signal, a reference signal, and a demagnetization signal generated based on at least information associated with the feedback signal, processing information associated with the feedback signal, the reference signal, and the demagnetization signal, and generating a protection signal based on at least information associated with the feedback signal, the reference signal, and the demagnetization signal, the demagnetization signal being related to multiple demagnetization periods of the power conversion system, the multiple demagnetization periods including a first demagnetization period and a second demagnetization period. The method additionally includes: receiving the protection signal, processing information associated with the protection signal, and outputting a drive signal to a switch configured to affect a current flowing through a primary winding of the power conversion system. The processing information associated with the feedback signal, the reference signal, and the demagnetization signal includes: processing information associated with the feedback signal and the reference signal during a first detection period, the first detection period including a first starting time and a first ending time, the first starting time being at or after a first demagnetization end of the first demagnetization period, determining, during the first detection period, a first number of times that the feedback signal changes from being smaller than the reference signal to being larger than the reference signal in magnitude, and determining whether the first number of times exceeds a predetermined threshold at the first ending time. The outputting a drive signal to a switch configured to affect a current flowing through a primary winding of the power conversion system includes: in response to the first number of times not exceeding the predetermined threshold at the first ending time, outputting the drive signal to cause the switch to open and remain open in order to protect the power conversion system.

According to yet another embodiment, a method for protecting a power conversion system includes: receiving a feedback signal, a reference signal, and a demagnetization signal generated based on at least information associated with the feedback signal, processing information associated with the feedback signal, the reference signal, and the demagnetization signal, and generating a protection signal based on at least information associated with the feedback signal, the reference signal, and the demagnetization signal, the demagnetization signal being related to multiple demagnetization periods of the power conversion system, the multiple demagnetization periods including a first demagnetization period and a second demagnetization period. The method further includes: receiving the protection signal, processing information associated with the protection signal, and outputting a drive signal to a switch configured to affect a current flowing through a primary winding of the power conversion system. The processing information associated with the feedback signal, the reference signal, and the demagnetization signal includes: processing information associated with the feedback signal and the reference signal during a first detection period, the first detection period including a first starting time and a first ending time, the first starting time being at or after a first demagnetization end of the first demagnetization period, determining, during the first detection period, a first number of times that the feedback signal changes from being larger than the reference signal to being larger than the reference signal in magnitude, and determining whether the first number of times exceeds a predetermined threshold at the first ending time. The outputting a drive signal to a switch configured to affect a current flowing through a primary winding of the power conversion system includes: in response to the first number of times not exceeding the predetermined threshold at the first ending time, outputting the drive signal to cause the switch to open and remain open in order to protect the power conversion system.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide a system and method for protecting one or more circuit components. Merely by way of example, some embodiments of the invention have been applied to power conversion systems. But it would be recognized that the invention has a much broader range of applicability.

Figure 1:
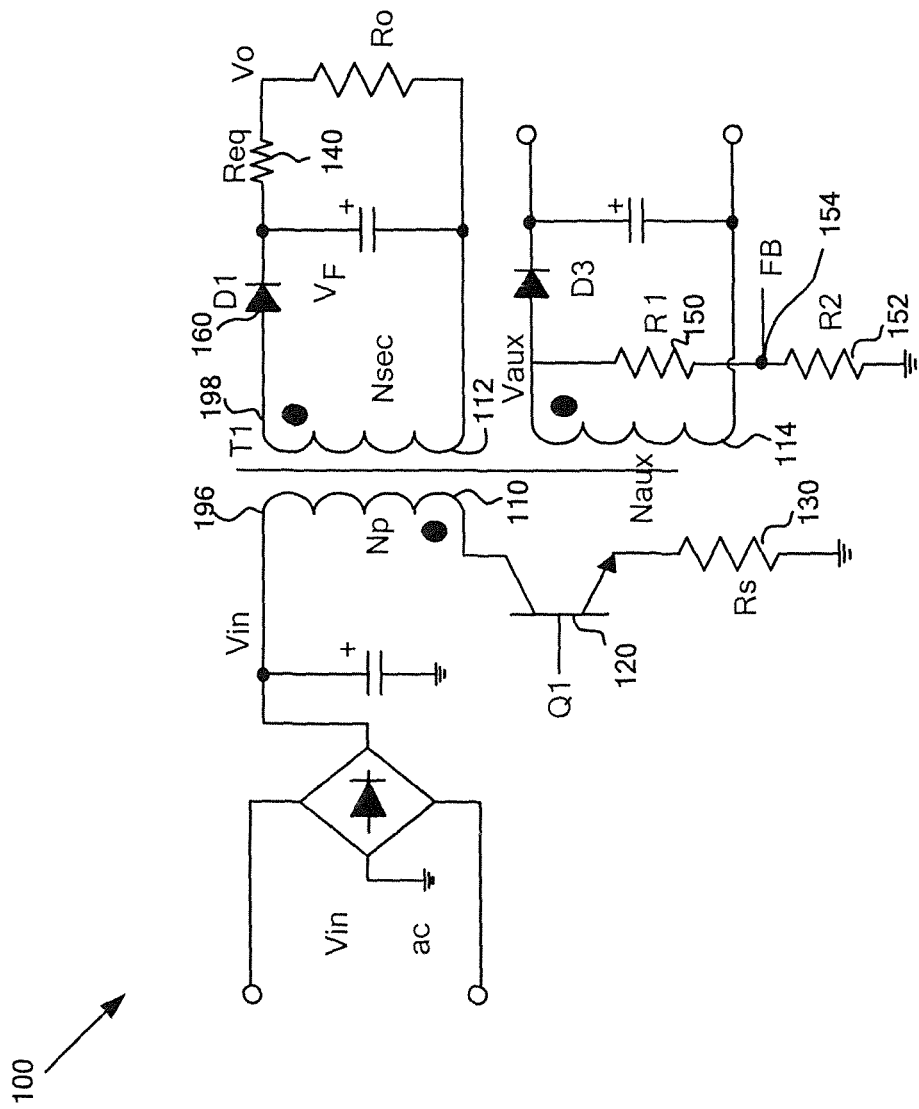
FIG. 1 is a simplified diagram showing a conventional flyback power conversion system with primary-side sensing and regulation.
Figure 2:
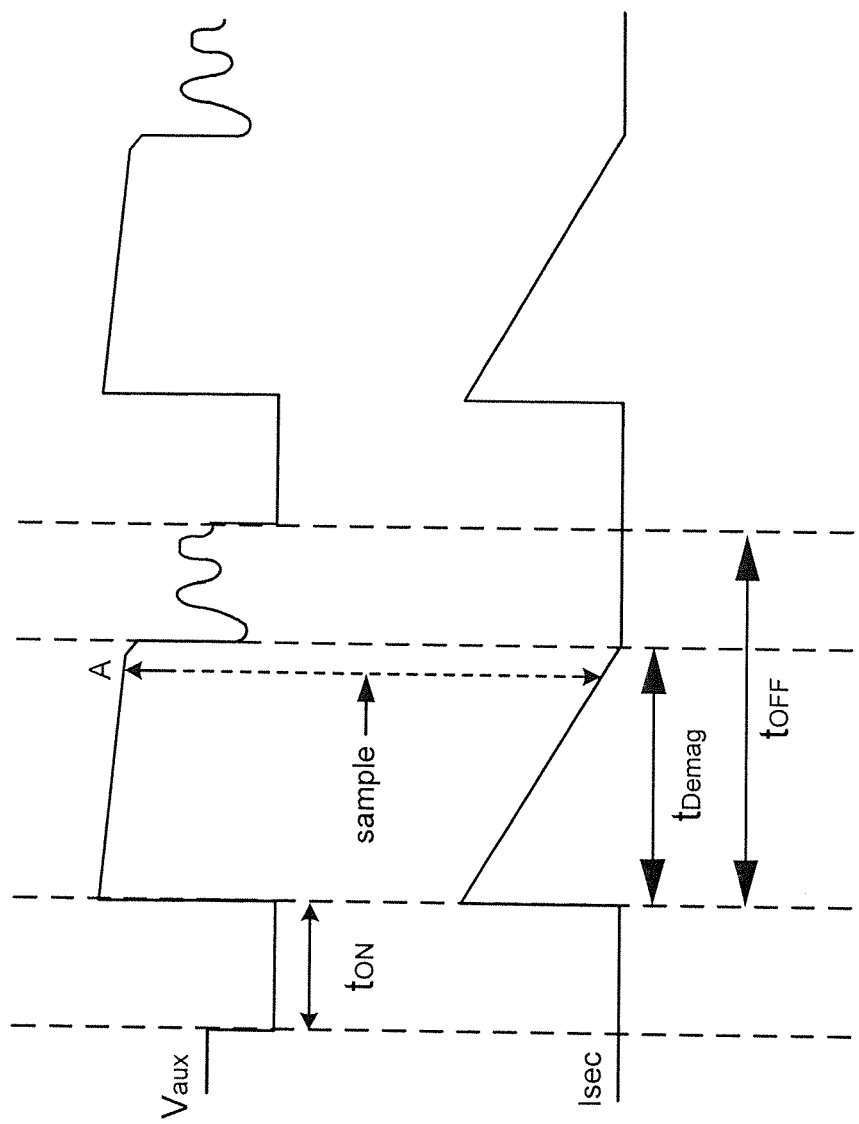
FIG. 2 is a simplified diagram showing a conventional operation mechanism for the flyback power conversion system as shown in FIG. 1.
Figure 3:
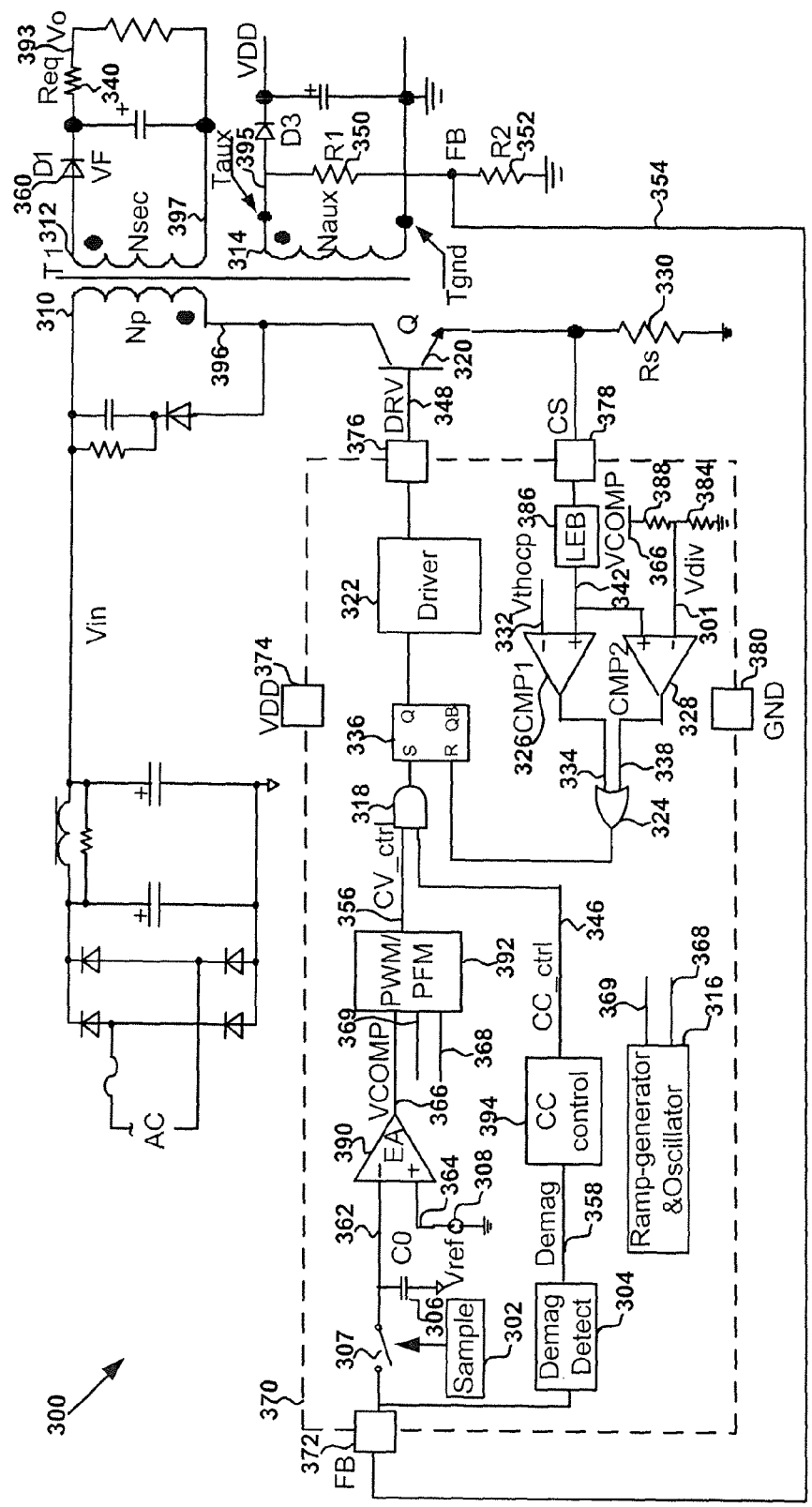
FIG. 3 is a simplified diagram showing a power conversion system with primary-side sensing and regulation.

FIG. 3 is a simplified diagram showing a power conversion system with primary-side sensing and regulation. The power conversion system 300 includes a primary winding 310, a secondary winding 312, an auxiliary winding 314, a power switch 320, a current sensing resistor 330, an equivalent resistor 340 for an output cable, resistors 350 and 352, a rectifying diode 360, and a controller 370. The controller 370 includes a sampling component 302, a demagnetization detector 304, a capacitor 306, a switch 307, a reference-signal generator 308, a ramp-generator-and-oscillator component 316, an AND gate 318, a driving component 322, an OR gate 324, comparators 326 and 328, a flip-flop component 336, a leading edge blanking (LEB) component 386, resistors 384 and 388, an error amplifier 390, a modulation component 392, and a constant-current (CC) component 394. For example, the power switch 320 is a bipolar transistor. In another example, the power switch 320 is a MOS transistor. In yet another example, the controller 370 includes terminals 372, 374, 376, 378 and 380. In yet another example, the rectifying diode 360 is a Schottky diode. For example, the ramp-generator-and-oscillator component 316 generates a clock signal 369 and a ramp signal 368.

For example, the auxiliary winding 314 is magnetically coupled to the secondary winding 312, which, with one or more other components, generates an output voltage 393. In another example, information related to the output voltage is processed by a voltage divider of the resistors 350 and 352, and is used to generate a feedback voltage 354, which is received by the terminal 372 (e.g., terminal FB) of the controller 370. In another example, the sampling component 302 samples the feedback voltage 354 and the sampled signal is held at the capacitor 306. As an example, the error amplifier 390 compares the sampled-and-held voltage 362 with a reference signal 364 generated by the reference-signal generator 308, and outputs a comparison signal 366 associated with the error of the sampled-and-held voltage 362 with respect to the reference signal 364. As another example, the comparison signal 366 is received by the modulation component 392. In some embodiments, the modulation component 392 receives the ramp signal 368 and/or the clock signal 369 from the ramp-generator-and-oscillator component 316 and outputs a signal 356 (e.g., CV_ctrl).

For example, the comparison signal 366 is used to control the pulse width for pulse-width modulation (PWM) and/or the switching frequency for pulse-frequency modulation (PFM) in order to regulate the output voltage in a constant-voltage mode. In another example, the demagnetization detector 304 determines the duration of a demagnetization period based on the feedback voltage 354 and outputs a detection signal 358 to the constant-current component 394 which generates a signal 346 (e.g., CC_ctrl). In yet another example, both the signal 356 and the signal 346 are received by the AND gate 318 to affect the flip-flop component 336 and in turn the driving component 322. In yet another example, the driving component 322 outputs a drive signal 348 through the terminal 376 to affect the status of the switch 320. In yet another example, a primary current 396 flowing through the primary winding 310 is sensed using the resistor 330, and a current-sensing signal 342 is generated through the LEB component 386 and received by the comparators 326 and 328. In yet another example, the comparator 326 receives a threshold voltage 332 (e.g., $V_{thocp}$), and the comparator 328 receives another threshold voltage 301 associated with the comparison signal 366 (e.g., $V_{comp}$). In yet another example, the comparator 326 and the comparator 328 output comparison signals 334 and 338 respectively, to the OR gate 324 to affect the flip-flop component 336. As an example, when the sampled-and-held voltage 362 is smaller than the reference signal 364 in magnitude, the error amplifier 390 outputs the comparison signal 366 at a logic high level. The power conversion system 300 operates in a constant-current mode, in some embodiments. For example, when the sampled-and-held voltage 362 is equal to the reference signal 364 in magnitude, the comparison signal 366 has a fixed magnitude. The power conversion system 300 operates in the constant-voltage mode, in certain embodiments.

Figure 4:
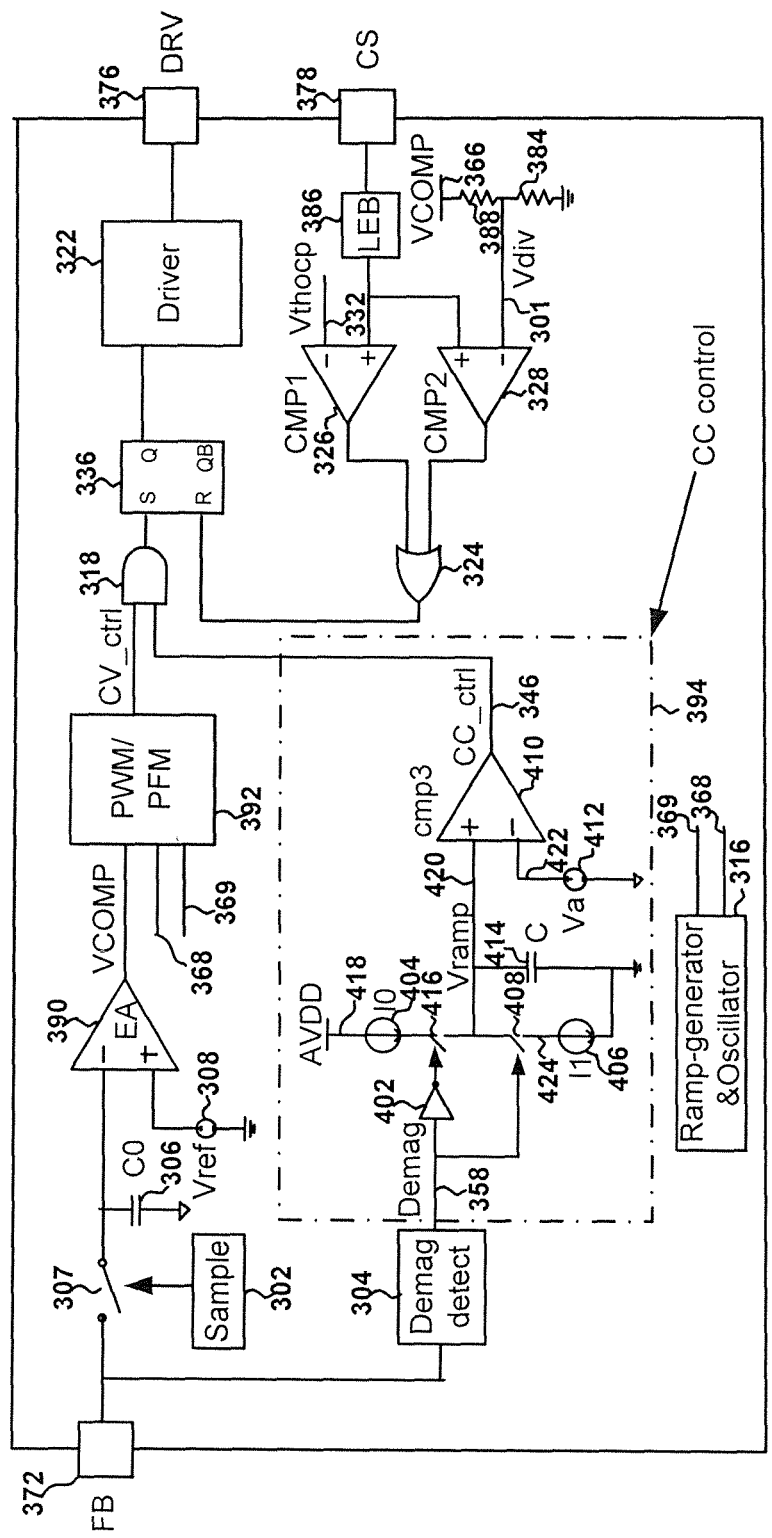
FIG. 4 is a simplified diagram showing at least certain components of a constant-current component as part of the power conversion system as shown in FIG. 3.

FIG. 4 is a simplified diagram showing at least certain components of the constant-current component 394 as part of the power conversion system 300. The constant-current component 394 includes a NOT gate 402, current sources 404 and 406, a switch 408, a capacitor 414, a comparator 410 and a reference-signal generator 412.

For example, when the detection signal 358 is at a logic low level, the switch 408 is open (e.g., being turned off) and the switch 416 is closed (e.g., being turned on). In another example, the current source 404 provides a current 418 (e.g., $I_0$) to charge the capacitor 414, and in response a signal 420 increases in magnitude. As an example, when the detection signal 358 is at a logic high level, the switch 416 is open (e.g., being turned off) and the switch 408 is closed (e.g., being turned on). As another example, the capacitor 414 is discharged through the current source 406 which provides a current 424 (e.g., $I_1$), and the signal 420 decreases in magnitude. For example, the comparator 410 receives the signal 420 and a reference signal 422 generated by the reference-signal generator 412 and outputs the signal 346. In certain embodiments, the modulation component 392 receives the clock signal 369 and/or the ramp signal 368 from the ramp-generator-and-oscillator component 316.

Figure 5:
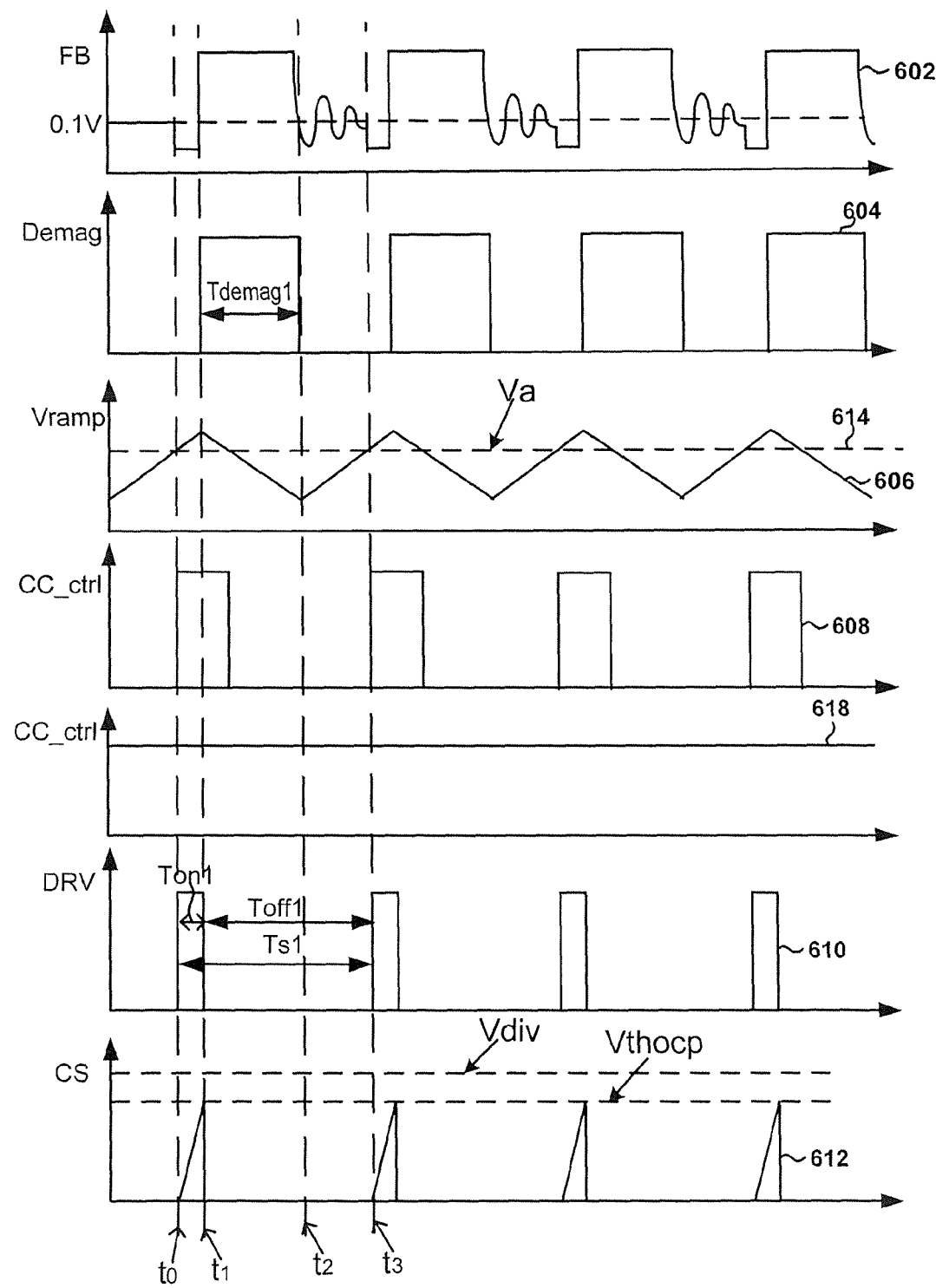
FIG. 5 is a simplified timing diagram for the power conversion system as shown in FIG. 3 in a constant-current mode.

FIG. 5 is a simplified timing diagram for the power conversion system 300 in a constant-current mode. The waveform 602 represents the feedback voltage 354 as a function of time, the waveform 604 represents the detection signal 358 as a function of time, and the waveform 606 represents the signal 420 as a function of time. The waveform 608 represents the signal 346 (e.g., CC_ctrl) as a function of time, the waveform 610 represents the signal 348 as a function of time, the waveform 612 represents the current-sensing signal 342 as a function of time, and the waveform 618 represents the signal 356 (e.g., CV_ctrl) as a function of time.

Four time periods are shown in FIG. 5. A switching period $T_{s1}$ includes an on-time period $T_{on1}$ and an off-time period $T_{off1}$ and corresponds to a modulation frequency. The off-time period $T_{off1}$ includes a demagnetization period $T_{demag1}$. The on-time period $T_{on1}$ starts at time $t_0$ and ends at time $t_1$, the demagnetization period $T_{demag1}$ starts at the time $t_1$ and ends at time $t_2$, and the off-time period $T_{off1}$ starts at the time $t_1$ and ends at time $t_3$. For example, $t_0 \le t_1 \le t_2 \le t_3$.

For example, as shown in the waveform 618, the signal 356 (e.g., CC_ctrl) keeps at a magnitude (e.g., 1) without changing in the constant-current mode. In another example, at the beginning of the on-time period $T_{on1}$ (e.g., at $t_0$), the signal 348 changes from a logic low level to a logic high level (e.g., as shown by the waveform 610), and in response the switch 320 is closed (e.g., being turned on). In yet another example, the transformer including the primary winding 310 and the secondary winding 312 stores energy, and the primary current 396 increases in magnitude (e.g., linearly). In yet another example, the current-sensing signal 342 increases in magnitude (e.g., as shown by the waveform 612).

As an example, the threshold voltage 332 (e.g., $V_{thocp}$) is smaller in magnitude than the threshold 301 (e.g., $V_{div}$). In another example, when the current-sensing signal 342 reaches the threshold voltage 332 (e.g., $V_{thocp}$), the comparator 326 changes the comparison signal 334 in order to turn off the switch 320. As another example, during the on-time period, the detection signal 358 (e.g., Demag) keeps at a logic low level (e.g., as shown by the waveform 604). As yet another example, the switch 408 is open (e.g., being turned off) and the switch 416 is closed (e.g., being turned on). As yet another example, the capacitor 414 is charged (e.g., at $I_0$), and the signal 420 increases in magnitude (e.g., linearly) as shown by the waveform 606.

In one example, at the beginning of the demagnetization period $T_{demag1}$ (e.g., at $t_1$), the signal 348 changes from the logic high level to the logic low level (e.g., as shown by the waveform 610), and in response the switch 320 is opened (e.g., being turned off). In another example, the energy stored in the transformer is released to the output terminal, and the demagnetization process begins. In yet another example, a secondary current 397 that flows through the secondary winding 312 decreases in magnitude (e.g., linearly). In yet another example, a voltage 395 at the auxiliary winding 314 maps the output voltage 393, and the feedback voltage 354 is generated through the voltage divider including the resistors 350 and 352. As an example, when the secondary current decreases to a low magnitude (e.g., 0), the demagnetization process ends. As another example, the transformer including the primary winding 310 and the secondary winding 312 enters a resonant status. As yet another example, a voltage 395 at the auxiliary winding 314 has an approximate sinusoidal waveform. In an example, during the demagnetization period, the detection signal 358 (e.g., Demag) keeps at a logic high level (e.g., as shown by the waveform 604). In yet another example, the switch 416 is opened (e.g., being turned off) and the switch 408 is closed (e.g., being turned on). In yet another example, the capacitor 414 is discharged (e.g., at $I_1$), and the signal 420 decreases in magnitude (e.g., linearly) as shown by the waveform 606. In yet another example, if the feedback voltage 354 becomes larger than the reference signal 516 (e.g., 0.1 V) in magnitude, it is determined that the demagnetization process has begun. In yet another example, if the feedback voltage 354 becomes smaller than the reference signal 516 (e.g., 0.1 V) in magnitude, it is determined that the demagnetization process has ended.

As one example, after the demagnetization process ends (e.g., at $t_2$), the detection signal 358 changes from the logic high level to the logic low level (e.g., as shown by the waveform 604). As another example, the switch 408 is open (e.g., being turned off) and the switch 416 is closed (e.g., being turned on). As yet another example, the capacitor 414 is charged again, and the signal 420 increases in magnitude (e.g., linearly) again as shown by the waveform 606. As yet another example, when the signal 420 becomes larger than a threshold voltage 614 (e.g., the reference signal 422) in magnitude (e.g., at $t_3$), the comparator 410 changes the signal 346 (e.g., CC_ctrl) from the logic low level to the logic high level (e.g., as shown by the waveform 608). As yet another example, in response to the signal 346 being at the logic high level, the driving component 322 changes the signal 348 from the logic low level to the logic high level (e.g., at $t_3$ as shown by the waveform 610).

Figure 6:
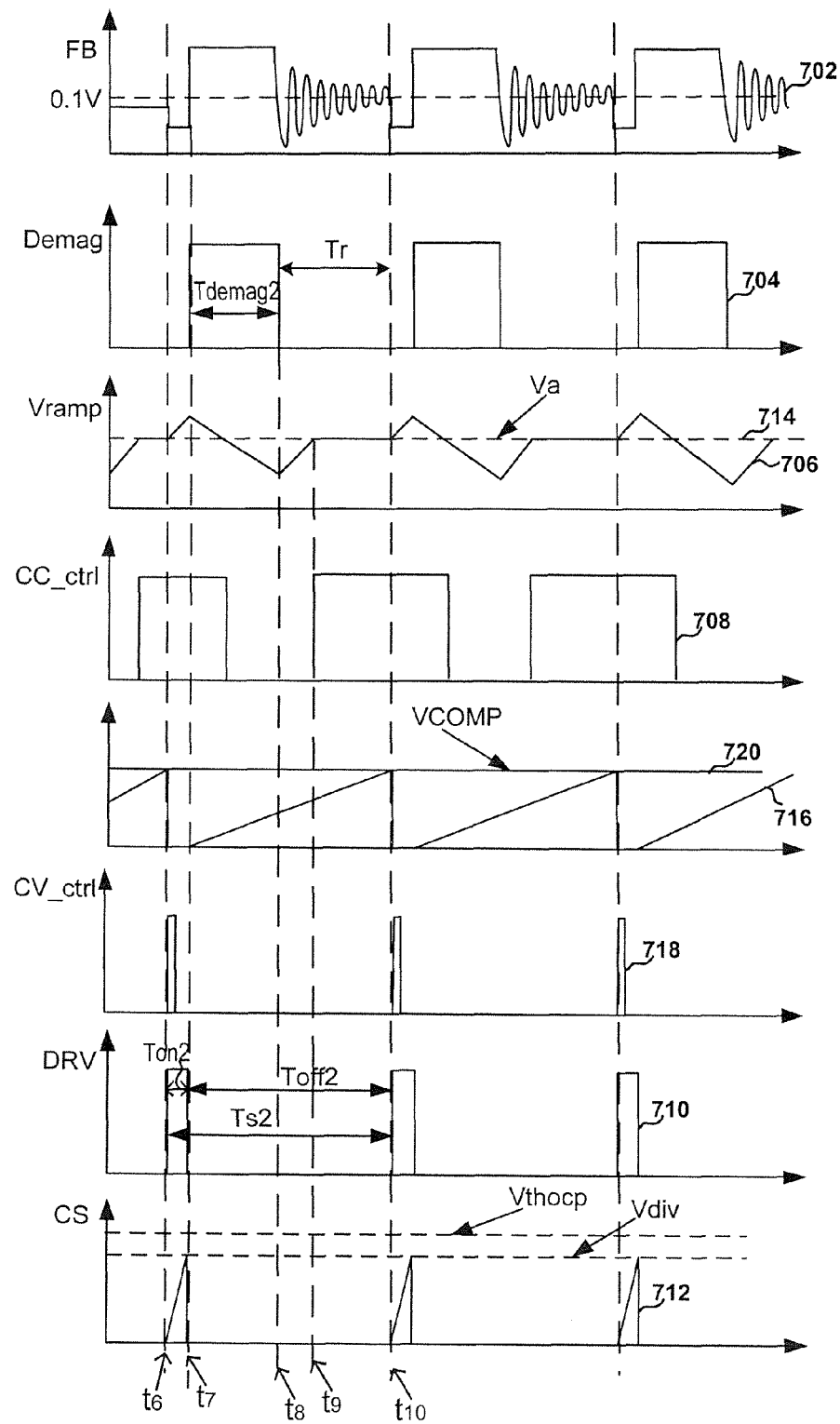
FIG. 6 is a simplified timing diagram for the power conversion system as shown in FIG. 3 in a constant-voltage mode.

FIG. 6 is a simplified timing diagram for the power conversion system 300 in a constant-voltage mode. The waveform 702 represents the feedback voltage 354 as a function of time, the waveform 704 represents the detection signal 358 as a function of time, and the waveform 706 represents the signal 420 as a function of time. The waveform 708 represents the signal 346 (e.g., CC_ctrl) as a function of time, the waveform 716 represents the signal 368 as a function of time, and the waveform 720 represents the comparison signal 366 as a function of time. In addition, the waveform 718 represents the signal 356 (e.g., CV_ctrl) as a function of time, the waveform 710 represents the signal 348 as a function of time, and the waveform 712 represents the current-sensing signal 342 as a function of time.

Four time periods are shown in FIG. 6. A switching period $T_{s2}$ includes an on-time period $T_{on2}$ and an off-time period $T_{off2}$ and corresponds to a modulation frequency. The off-time period $T_{off2}$ includes a demagnetization period $T_{demag2}$. The on-time period $T_{on2}$ starts at time $t_6$ and ends at time $t_7$, the demagnetization period $T_{demag2}$ starts at the time $t_7$ and ends at time $t_8$, and the off-time period $T_{off2}$ starts at the time $t_7$ and ends at time $t_{10}$. For example, $t_6 \leq t_7 \leq t_8 \leq t_9 \leq t_{10}$.

For example, at the beginning of the on-time period $T_{on2}$ (e.g., at $t_6$), the signal 348 changes from a logic low level to a logic high level (e.g., as shown by the waveform 710), and in response the switch 320 is closed (e.g., being turned on). In yet another example, the transformer including the primary winding 310 and the secondary winding 312 stores energy, and the primary current 396 increases in magnitude (e.g., linearly). In yet another example, the current-sensing signal 342 increases in magnitude (e.g., as shown by the waveform 712). In yet another example, at the beginning of the on-time period $T_{on2}$ (e.g., at $t_6$), the signal 356 changes from the logic low level to the logic high level (e.g., as shown by the waveform 718) in order to close the switch 320.

As an example, the threshold voltage 332 (e.g., $V_{thocp}$) is larger in magnitude than the threshold 301 (e.g., $V_{div}$). In another example, when the current-sensing signal 342 reaches the threshold voltage 301 (e.g., $V_{div}$), the comparator 328 changes the comparison signal 338 in order to turn off the switch 320. As another example, during the on-time period, the detection signal 358 (e.g., Demag) keeps at a logic low level (e.g., as shown by the waveform 704). As yet another example, the switch 408 is open (e.g., being turned off) and the switch 416 is closed (e.g., being turned on). As yet another example, the capacitor 414 is charged (e.g., at $I_0$), and the signal 420 increases in magnitude (e.g., linearly) as shown by the waveform 706.

In one example, at the beginning of the demagnetization period $T_{demag2}$ (e.g., at $t_7$), the signal 348 changes from the logic high level to the logic low level (e.g., as shown by the waveform 710), and in response the switch 320 is opened (e.g., being turned off). In another example, the energy stored in the transformer is released to the output terminal, and the demagnetization process begins. In yet another example, a secondary current 397 that flows through the secondary winding 312 decreases in magnitude (e.g., linearly). In yet another example, a voltage 395 at the auxiliary winding 314 maps the output voltage 393, and the feedback voltage 354 is generated through the voltage divider including the resistors 350 and 352. As an example, when the secondary current decreases to the low magnitude (e.g., 0), the demagnetization process ends. As another example, the transformer including the primary winding 310 and the secondary winding 312 enters the resonant status. As yet another example, the voltage 395 at the auxiliary winding 314 has an approximate sinusoidal waveform. In an example, during the demagnetization period, the detection signal 358 (e.g., Demag) keeps at the logic high level (e.g., as shown by the waveform 704). In yet another example, the switch 416 is opened (e.g., being turned off) and the switch 408 is closed (e.g., being turned on). In yet another example, the capacitor 414 is discharged (e.g., at $I_1$), and the signal 420 decreases in magnitude (e.g., linearly) as shown by the waveform 706. In yet another example, if the feedback voltage 354 becomes larger than the reference signal 516 (e.g., 0.1 V) in magnitude, it is determined that the demagnetization process has begun. In yet another example, if the feedback voltage 354 becomes smaller than the reference signal 516 (e.g., 0.1 V) in magnitude, it is determined that the demagnetization process has ended.

As one example, after the demagnetization process ends (e.g., at $t_8$), the detection signal 358 changes from the logic high level to the logic low level (e.g., as shown by the waveform 704). As another example, the switch 408 is open (e.g., being turned off) and the switch 416 is closed (e.g., being turned on). As yet another example, the capacitor 414 is charged again, and the signal 420 increases in magnitude (e.g., linearly) again as shown by the waveform 706. As yet another example, when the signal 420 reaches a threshold 714 (e.g., the reference signal 422) in magnitude (e.g., at $t_9$), the comparator 410 changes the signal 346 (e.g., CC_ctrl) from the logic low level to the logic high level (e.g., as shown by the waveform 708). In yet another example, the signal 420 keeps at the threshold 714 until the end of the off-time period $T_{off2}$ (e.g., until $t_{10}$ as shown by the waveform 706). For example, the signal 368 increases in magnitude during the off-time period $T_{off2}$. In another example, when the signal 368 reaches the comparison signal 366 in magnitude at the end of the off-time period $T_{off2}$ (e.g., at $t_{10}$ as shown by the waveforms 716 and 720), the signal 356 changes from the logic low level to the logic high level (e.g., as shown by the waveform 718) in order to close the switch 320. As shown in FIG. 6, when the rectifying diode 360 operates normally, multiple rings appear in the feedback voltage 354 during a resonance time period (e.g., $T_r$) from the end of the demagnetization period (e.g., $t_8$) to the end of the off-time period (e.g., $t_{10}$), as shown by the waveform 702.

Figure 7:
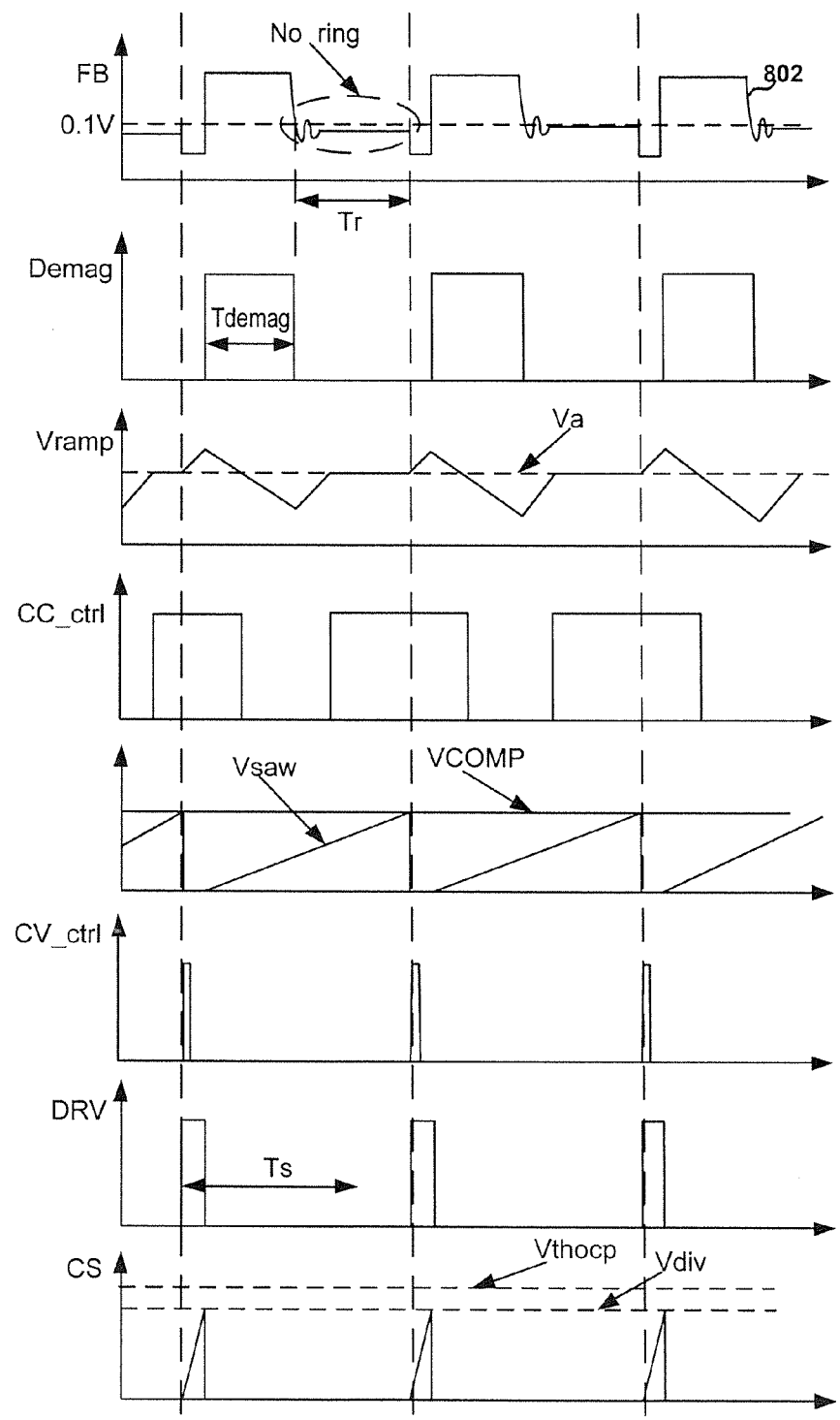
FIG. 7 is a simplified timing diagram for the power conversion system as shown in FIG. 3 in a constant-voltage mode under thermal runaway of a rectifying diode according to one embodiment.

FIG. 7 is a simplified timing diagram for the power conversion system 300 in a constant-voltage mode under thermal runaway of the rectifying diode 360 according to one embodiment. The waveform 802 represents the feedback voltage 354 as a function of time. As shown in FIG. 7, few rings or no rings appear in the feedback voltage 354 during the resonance time period (e.g., $T_r$), which indicates that the transformer including the primary winding 310 and the secondary winding 312 does not enter a resonant status.

Figure 8:
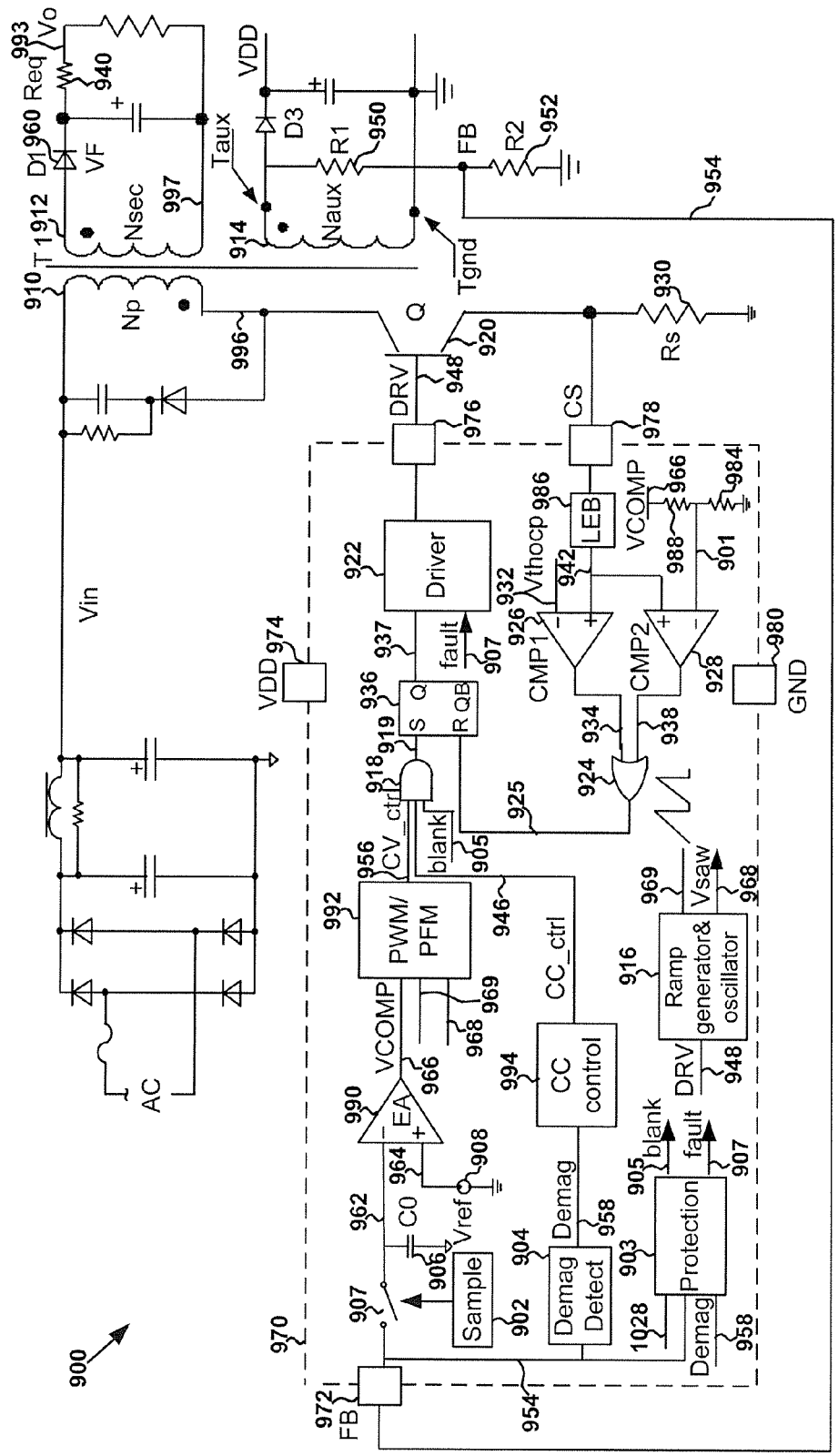
FIG. 8 is a simplified diagram showing a power conversion system with primary-side sensing and regulation according to an embodiment of the present invention.

FIG. 8 is a simplified diagram showing a power conversion system with primary-side sensing and regulation according to an embodiment of the present invention. This diagram is merely an example, which should not unduly limit the scope of the claims. One of ordinary skill in the art would recognize many variations, alternatives, and modifications. The power conversion system 900 includes a primary winding 910, a secondary winding 912, an auxiliary winding 914, a power switch 920, a current sensing resistor 930, an equivalent resistor 940 for an output cable, resistors 950 and 952, a rectifying diode 960, and a controller 970. The controller 970 includes a sampling component 902, a demagnetization detector 904, a capacitor 906, a switch 907, a reference-signal generator 908, a ramp-generator-and-oscillator 916, an AND gate 918, a driving component 922, an OR gate 924, comparators 926 and 928, a flip-flop component 936, a leading edge blanking (LEB) component 986, resistors 984 and 988, an error amplifier 990, a modulation component 992, a protection component 903, and a constant-current (CC) component 994. For example, the power switch 920 is a bipolar transistor. In another example, the power switch 920 is a MOS transistor. In yet another example, the controller 970 includes terminals 972, 974, 976, 978 and 980. In yet another example, the rectifying diode 960 is a Schottky diode.

According to one embodiment, the auxiliary winding 914 is magnetically coupled to the secondary winding 912, which, with one or more other components, generates an output voltage 993. For example, information related to the output voltage is processed by a voltage divider of the resistors 950 and 952, and is used to generate a feedback voltage 954, which is received by the terminal 972 (e.g., terminal FB) of the controller 970. In another example, the sampling component 902 samples the feedback voltage 954 and the sampled signal is held at the capacitor 906. As an example, the error amplifier 990 compares the sampled-and-held voltage 962 with a reference signal 964 generated by the reference-signal generator 908, and outputs a comparison signal 966 associated with the error of the sampled-and-held voltage 962 with respect to the reference signal 964. As another example, the comparison signal 966 is received by the modulation component 992 which receives a ramping signal 968 and/or a clock signal 969 from the ramp-generator-and-oscillator 916 and outputs a signal 956 (e.g., CV_ctrl).

According to another embodiment, the comparison signal 966 is used to control the pulse width for PWM and/or the switching frequency for PFM in order to regulate the output voltage in a constant-voltage mode. For example, the demagnetization detector 904 determines the duration of a demagnetization period based on the feedback voltage 954 and outputs a detection signal 958 to the constant-current component 994 which generates a signal 946 (e.g., CC_ctrl). In another example, the protection component 903 receives the feedback voltage 954 and the detection signal 958 and outputs a blanking signal 905 and a fault signal 907. In yet another example, the AND gate 918 receives the signal 956 (e.g., CV_ctrl), the signal 946 (e.g., CC_ctrl) and the blanking signal 905 and outputs a signal 919 that is received by the flip-flop component 936 (e.g., at a set terminal "S"). In yet another example, the flip-flop component 936 outputs a signal 937 (e.g., at a terminal "Q") to the driving component 922. In yet another example, the driving component 922 also receives the signal 907 (e.g., fault) and outputs a drive signal 948 through the terminal 976 to affect the status of the switch 920. In yet another example, a primary current 996 flowing through the primary winding 910 is sensed using the resistor 930, and a current-sensing signal 942 is generated through the LEB component 986 and received by the comparators 926 and 928. In yet another example, the comparator 926 receives a threshold voltage 932 (e.g., $V_{thocp}$), and the comparator 928 receives another threshold voltage 901 associated with the comparison signal 966 (e.g., $V_{comp}$). In yet another example, the comparator 926 and the comparator 928 output comparison signals 934 and 938 respectively, to the OR gate 924. In yet another example, the OR gate 924 outputs a signal 925 to the flip-flop component 936 (e.g., at a reset terminal "R"). As an example, when the sampled-and-held voltage 962 is smaller than the reference signal 964 in magnitude, the error amplifier 990 outputs the comparison signal 966 at a logic high level. The power conversion system 900 operates in a constant-current mode, in some embodiments. For example, when the sampled-and-held voltage 962 is equal to the reference signal 964 in magnitude, the comparison signal 966 has a fixed magnitude. The power conversion system 900 operates in the constant-voltage mode, in certain embodiments.

Figure 9:
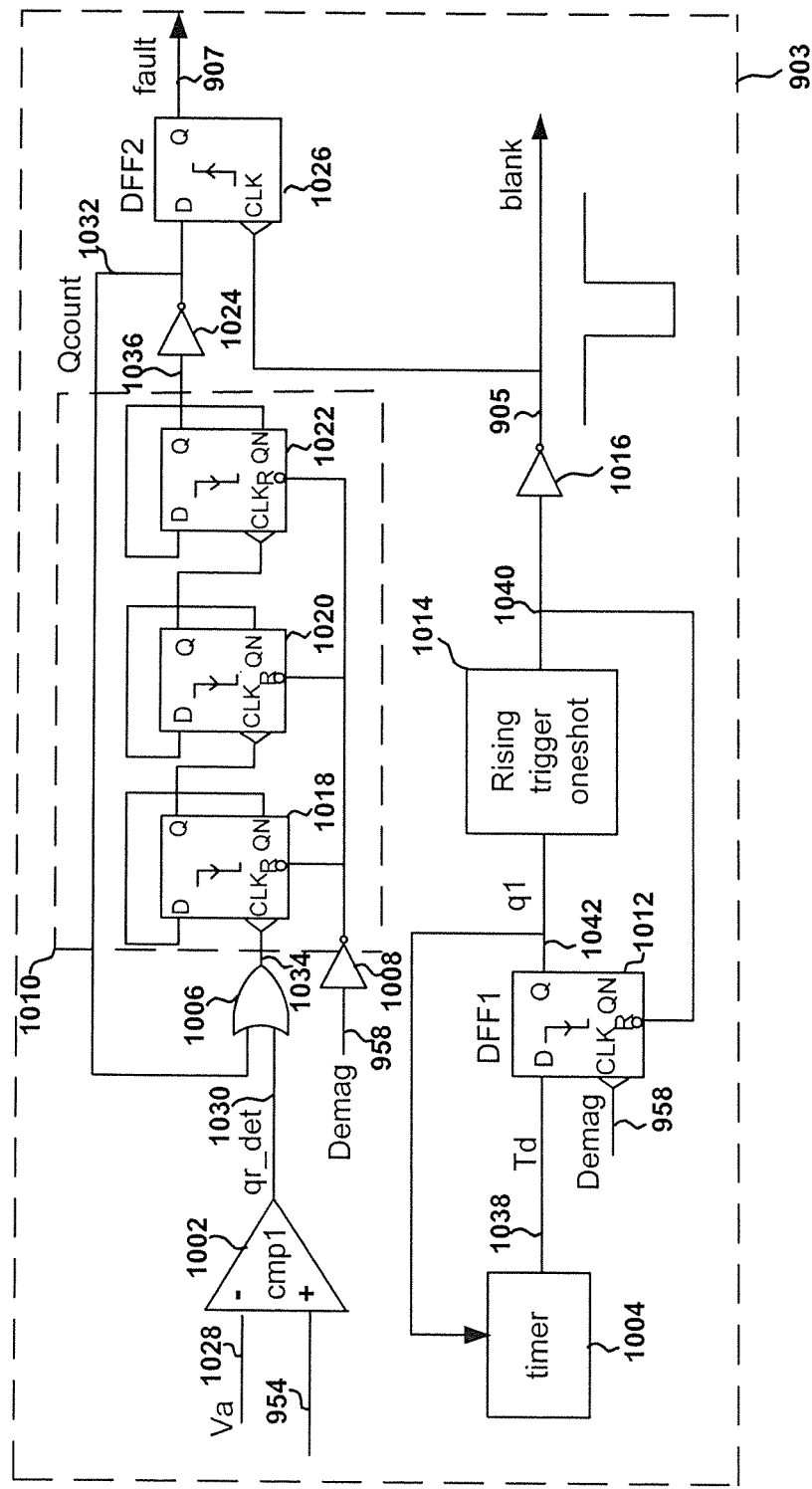
FIG. 9 is a simplified diagram showing a protection component as part of the power conversion system as shown in FIG. 8 according to an embodiment of the present invention.

FIG. 9 is a simplified diagram showing the protection component 903 as part of the power conversion system 900 according to an embodiment of the present invention. This diagram is merely an example, which should not unduly limit the scope of the claims. One of ordinary skill in the art would recognize many variations, alternatives, and modifications. The protection component 903 includes a comparator 1002, a timer component 1004, an OR gate 1006, NOT gates 1008, 1016 and 1024, a counter-and-logic component 1010, flip-flop components 1012 and 1026, and a trigger component 1014. The counter-and-logic component 1010 includes flip-flop components 1018, 1020 and 1022.

According to one embodiment, the comparator 1002 receives the feedback voltage 954 and a reference signal 1028 and output a comparison signal 1030 to the OR gate 1006. For example, the OR gate 1006 also receives a signal 1032 from the NOT gate 1024 and outputs a signal 1034 to the counter-and-logic component 1010 which outputs a signal 1036 to the NOT gate 1024. In another example, the timer component 1004 outputs a signal 1038 to the flip-flop component 1012 (e.g., at a terminal "D") which also receives the signal 958 (e.g., at a terminal "CLK"). In yet another example, the flip-flop component 1012 outputs a signal 1042 (e.g., at a terminal "Q") to the timer component 1004 and the trigger component 1014 which provides a signal 1040 to the flip-flop component 1012 (e.g., at a terminal "R") and the NOT gate 1016. In yet another example, the flip-flop component 1026 receives the signal 1032 (e.g., at a terminal "D") and the blanking signal 905 (e.g., at a terminal "CLK") and outputs the fault signal 907 (e.g., at a terminal "Q"). In yet another example, a rising edge of the signal 1042 (e.g., q1) corresponds to a falling edge of the signal 1038. In yet another example, the flip-flop component 1018 receives the signal 1034 (e.g., at a "CLK" terminal).

Figure 10:
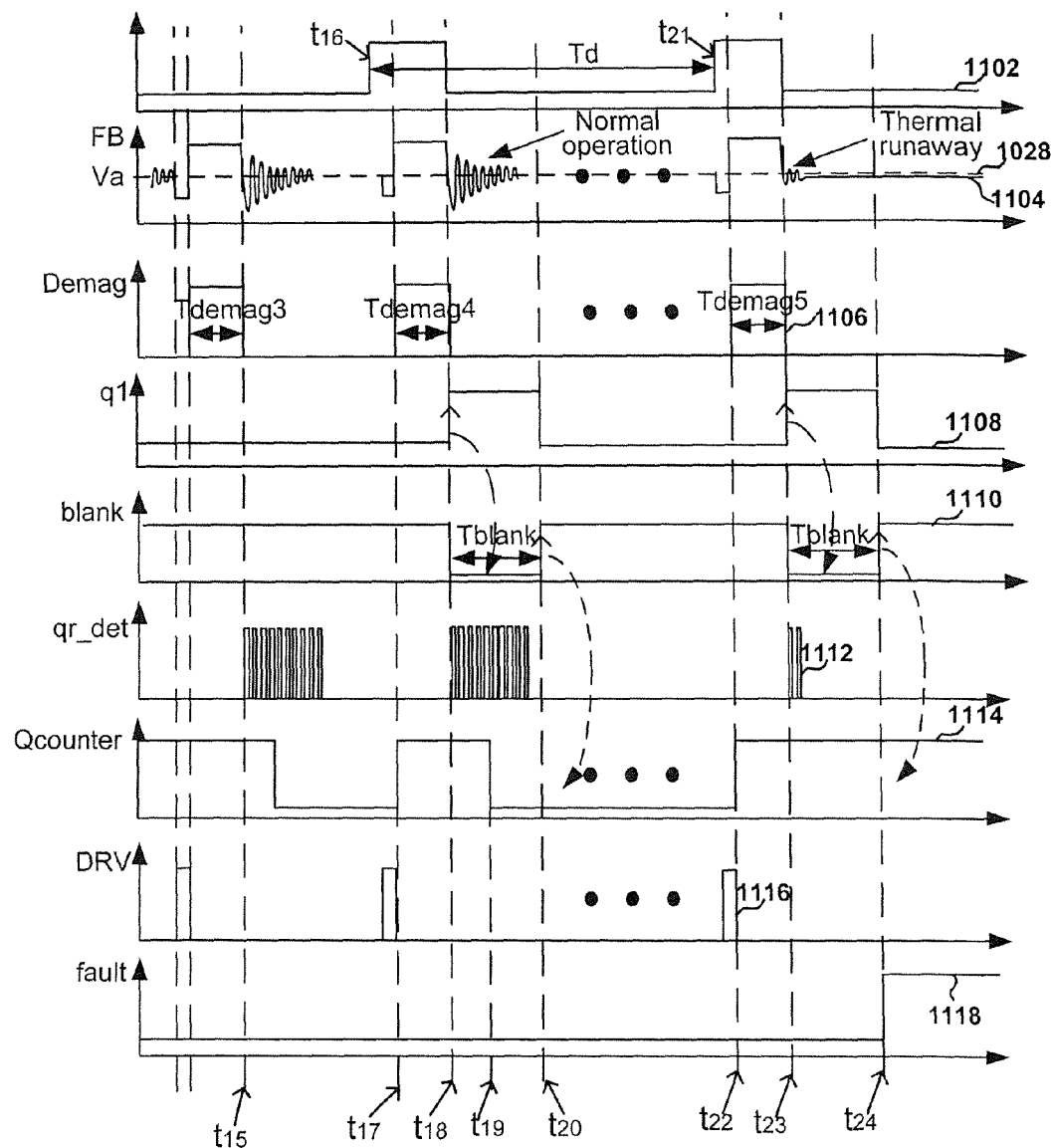
FIG. 10 is a simplified timing diagram for the power conversion system as shown in FIG. 8 according to an embodiment of the present invention.

FIG. 10 is a simplified timing diagram for the power conversion system 900 according to an embodiment of the present invention. This diagram is merely an example, which should not unduly limit the scope of the claims. One of ordinary skill in the art would recognize many variations, alternatives, and modifications. The waveform 1102 represents the signal 1038 as a function of time, the waveform 1104 represents the feedback voltage 954 as a function of time, and the waveform 1106 represents the signal 958 as a function of time. In addition, the waveform 1108 represents the signal 1042 (e.g., q1) as a function of time, the waveform 1110 represents the blanking signal 905 as a function of time, and the waveform 1112 represents the signal 1030 (e.g., qr_det) as a function of time. The waveform 1114 represents the signal 1032 (e.g., Qcounter) as a function of time, the waveform 1116 represents the signal 948 (e.g., DRV) as a function of time, and the waveform 1118 represents the fault signal 907 (e.g., fault) as a function of time. For example, $t_{15} \leq t_{16} \leq t_{17} \leq t_{18} \leq t_{19} \leq t_{20} \leq t_{21} \leq t_{22} \leq t_{23} \leq t_{24}$.

Referring to FIG. 8, FIG. 9 and FIG. 10, the timer component 1004 changes the signal 1038 from a logic low level to a logic high level from time to time (e.g., with a time interval $T_d$) as shown by the waveform 1102, in some embodiments. For example, at $t_{15}$, the detection signal 958 changes from a logic high level to a logic low level (e.g., as shown by the waveform 1106), which indicates the end of the demagnetization period $T_{demag3}$. For example, the timer component 1004 outputs the signal 1038 at a logic low level (e.g., as shown by the waveform 1102), and in response, the flip-flop component 1012 (e.g., DFF1) outputs the signal 1042 (e.g., q1) at the logic low level (e.g., as shown by the waveform 1108). The power conversion system 900 operates normally, in certain embodiments. For example, the time interval $T_d$ is about 10 ms.

According to one embodiment, between $t_{15}$ and $t_{16}$, the signal 1038 keeps at the logic low level, and the signal 1042 (e.g., q1) keeps at the logic low level. For example, the fault signal 907 keeps at the logic low level, even if the signal 1032 (e.g., Qcounter) changes from the logic high level to the logic low level. In another example, at $t_{16}$, the timer component 1004 changes the signal 1038 from the logic low level to the logic high level (e.g., as shown by the waveform 1102). In yet another example, between $t_{16}$ and $t_{21}$ (e.g., $T_d$), the timer component 1004 keeps the signal 1038 at the logic high level if no falling edge is detected in the detection signal 958. In yet another example, at $t_{17}$, the detection signal 958 changes from the logic low level to the logic high level (e.g., as shown by the waveform 1106), which indicates the beginning of the demagnetization period $T_{demag4}$. In yet another example, at $t_{18}$, the detection signal 958 changes from the logic high level to the logic low level (e.g., as shown by the waveform 1106), which indicates the end of the demagnetization period $T_{demag4}$. In yet another example, upon detection of the falling edge in the detection signal 958 (e.g., at $t_{18}$), the timer component 1004 changes the signal 1038 from the logic high level to the logic low level (e.g., as shown by the waveform 1102). In response to the change of the signal 1038, the trigger component 1014 changes the signal 1040, and the blanking signal 905 changes from the logic high level to the logic low level, in some embodiments. For example, the flip-flop component 1012 changes the signal 1042 (e.g., q1) from the logic low level to the logic high level (e.g., at $t_{18}$ as shown by the waveform 1108). The power conversion system 900 enters into a thermal-runaway-detection mode, in some embodiments. For example, a clock associated with the timer component 1004 is restarted toward a next time interval $T_d$. As an example, $T_d$ is predetermined, and is longer than multiple switching periods associated with the power conversion system 900.

According to another embodiment, when the blanking signal 905 is at the logic low level, i.e., during a detection period (e.g., $T_{blank}$), the signal 919 from the AND gate 918 is at the logic low level so that the switch 920 is kept open (e.g., being turned off), regardless of the signal 956 (e.g., CV_ctrl) and the signal 946 (e.g., CC_ctrl). As an example, a starting time of the detection period (e.g., $T_{blank}$) is at $t_{18}$ and an ending time of the detection period (e.g., $T_{blank}$) is at $t_{20}$. In another example, the blanking signal 905 changes from the logic low level to the logic high level after the detection period (e.g., at $t_{20}$, as shown by the waveform 1110). As an example, the comparator compares the feedback voltage 954 and the reference signal 1028 (e.g., 0.1 V), and determines whether multiple resonance rings occur in the feedback voltage 954. As another example, the counter-and-logic component 1010 determines the number of the resonance rings in the feedback voltage 954. As yet another example, the detection period (e.g., $T_{blank}$) is about 20 μs. For example, a resonance ring corresponds to the feedback voltage 954 becoming smaller than the reference signal 1028 in magnitude. In yet another example, the detection period (e.g., $T_{blank}$) starts when the timer component 1004 changes the signal 1038 from the logic high level to the logic low level. In yet another example, the detection period (e.g., $T_{blank}$) ends when the flip-flop component 1012 changes the signal 1042 (e.g., q1) from the logic high level to the logic low level.

According to yet another embodiment, if the counter-and-logic component 1010 determines the number of the resonance rings appearing in the feedback voltage 954 (e.g., the feedback voltage 954 becoming smaller than the reference signal 1028) during the detection period (e.g., $T_{blank}$) reaches a threshold (e.g., 4), the signal 1032 (e.g., Qcounter) changes to the logic low level (e.g., at $t_{19}$, as shown by the waveforms 1104 and 1114), and the counter-and-logic component 1010 stops counting. For example, upon the rising edge of the blanking signal 905 (e.g., at $t_{20}$ as shown by the waveform 1110), the flip-flop component 1026 (e.g., DFF2) detects the signal 1032 (e.g., Qcounter), and outputs the fault signal 907 at the logic low level in response to the signal 1032 being at the logic low level (e.g., as shown by the waveforms 1114 and 1118). The power conversion system 900 is not in a thermal-runaway status, and continues to operate normally, in certain embodiments. For example, the driving component 922 outputs the drive signal 948 to close or open the switch 920 according to one or more modulation frequencies. In certain embodiments, the time period between $t_{20}$ and $t_{21}$ includes one or more switching periods. For example, the power conversion system 900 enters into the thermal-runaway-detection mode during each switching period. That is, during a detection period (e.g., $T_{blank}$) within each switching period, whether the number of the resonance rings appearing in the feedback voltage 954 reaches the threshold is determined for detecting thermal runaway.

In one embodiment, at $t_{21}$, another time interval $T_d$ begins, and the clock associated with the timer component 1004 is restarted to count the time. For example, the timer component 1004 changes the signal 1038 from the logic low level to the logic high level (e.g., at $t_{21}$ as shown by the waveform 1102). In another example, at $t_{22}$, the detection signal 958 changes from the logic low level to the logic high level (e.g., as shown by the waveform 1106), which indicates the beginning of the demagnetization period $T_{demag5}$. In yet another example, at $t_{23}$, the detection signal 958 changes from the logic high level to the logic low level (e.g., as shown by the waveform 1106), which indicates the end of the demagnetization period $T_{demag5}$. In yet another example, the timer component 1004 changes the signal 1038 from the logic high level to the logic low level (e.g., as shown by the waveform 1102), and in response, the flip-flop component 1012 changes the signal 1042 (e.g., 1) from the logic low level to the logic high level (e.g., as shown by the waveform 1108). The power conversion system 900 enters into the thermal-runaway-detection mode again, in some embodiments.

In another embodiment, at $t_{23}$, the trigger component 1014 changes the signal 1040, and as a result the blanking signal 905 changes from the logic high level to the logic low level. For example, the blanking signal 905 changes from the logic low level to the logic high level after another detection period (e.g., $T_{blank}$), as shown by the waveform 1110. In another example, during the detection period (e.g., $T_{blank}$), the switch 920 is kept open (e.g., being turned off), regardless of the signal 956 (e.g., CV_ctrl) and the signal 946 (e.g., CC_ctrl). As an example, the comparator compares the feedback voltage 954 and the reference signal 1028 (e.g., 0.1 V), and determines whether multiple resonance rings occur in the feedback voltage 954. As another example, the counter-and-logic component 1010 determines the number of the resonance rings in the feedback voltage 954.

In yet another embodiment, if the counter-and-logic component 1010 determines the number of the resonance rings in the feedback voltage 954 during the detection period (e.g., $T_{blank}$) is smaller than the threshold (e.g., 4), the signal 1032 (e.g., Qcounter) keeps at the logic high level (e.g., as shown by the waveforms 1104 and 1114). For example, upon the rising edge of the blanking signal 905 (e.g., at $t_{24}$ as shown by the waveform 1110), the flip-flop component 1026 (e.g., DFF2) detects the signal 1032 (e.g., Qcounter), and changes the fault signal 907 from the logic low level to the logic high level in response to the signal 1032 being at the logic high level (e.g., as shown by the waveforms 1114 and 1118). The power conversion system 900 is determined to be in the thermal-runaway status, and enters into an auto-recovery mode or an analog latch mode, in certain embodiments. For example, the power conversion system 900 stops operation and there is no output signal from the power conversion system 900 unless the power conversion system 900 is powered down (e.g., a power cord is unplugged) and restarted (e.g., the power cord is plugged in), so that the temperature of the diode 960 can decrease for the system 900 to operate safely. In another example, the demagnetization period $T_{demag5}$ is separated from the demagnetization period $T_{demag4}$ by one or more switching periods associated with the drive signal 948.

As discussed above and further emphasized here, FIG. 10 is merely an example, which should not unduly limit the scope of the claims. One of ordinary skill in the art would recognize many variations, alternatives, and modifications. For example, a resonance ring corresponds to the feedback voltage 954 exceeding the reference signal 1028 in magnitude.

According to one embodiment, a system controller for protecting a power conversion system includes a protection component and a driving component. The protection component is configured to receive a feedback signal, a reference signal, and a demagnetization signal generated based on at least information associated with the feedback signal, process information associated with the feedback signal, the reference signal, and the demagnetization signal, and generate a protection signal based on at least information associated with the feedback signal, the reference signal, and the demagnetization signal. The demagnetization signal is related to multiple demagnetization periods of the power conversion system, the multiple demagnetization periods including a first demagnetization period and a second demagnetization period. The driving component is configured to receive the protection signal and output a drive signal to a switch configured to affect a current flowing through a primary winding of the power conversion system. The protection component is further configured to: process information associated with the feedback signal and the reference signal during a first detection period, the first detection period including a first starting time and a first ending time, the first starting time being at or after a first demagnetization end of the first demagnetization period, determine, during the first detection period, a first number of times that the feedback signal changes from being smaller than the reference signal to being larger than the reference signal in magnitude, and determine whether the first number of times exceeds a predetermined threshold at the first ending time. The protection component and the driving component are further configured to, in response to the first number of times not exceeding the predetermined threshold at the first ending time, output the drive signal to cause the switch to open and remain open in order to protect the power conversion system. For example, the system controller is implemented according to FIG. 8, and/or FIG. 9.

According to another embodiment, a system controller for protecting a power conversion system includes a protection component and a driving component. The protection component is configured to receive a feedback signal, a reference signal, and a demagnetization signal generated based on at least information associated with the feedback signal, process information associated with the feedback signal, the reference signal, and the demagnetization signal, and generate a protection signal based on at least information associated with the feedback signal, the reference signal, and the demagnetization signal. The demagnetization signal is related to multiple demagnetization periods of the power conversion system, the multiple demagnetization periods including a first demagnetization period and a second demagnetization period. The driving component is configured to receive the protection signal and output a drive signal to a switch configured to affect a current flowing through a primary winding of the power conversion system. The protection component is further configured to: process information associated with the feedback signal and the reference signal during a first detection period, the first detection period including a first starting time and a first ending time, the first starting time being at or after a first demagnetization end of the first demagnetization period, determine, during the first detection period, a first number of times that the feedback signal changes from being larger than the reference signal to being smaller than the reference signal in magnitude, and determine whether the first number of times exceeds a predetermined threshold at the first ending time. The protection component and the driving component are further configured to, in response to the first number of times not exceeding the predetermined threshold at the first ending time, output the drive signal to cause the switch to open and remain open in order to protect the power conversion system. For example, the system controller is implemented according to FIG. 8, and/or FIG. 9.

According to yet another embodiment, a method for protecting a power conversion system includes: receiving a feedback signal, a reference signal, and a demagnetization signal generated based on at least information associated with the feedback signal, processing information associated with the feedback signal, the reference signal, and the demagnetization signal, and generating a protection signal based on at least information associated with the feedback signal, the reference signal, and the demagnetization signal, the demagnetization signal being related to multiple demagnetization periods of the power conversion system, the multiple demagnetization periods including a first demagnetization period and a second demagnetization period. The method additionally includes: receiving the protection signal, processing information associated with the protection signal, and outputting a drive signal to a switch configured to affect a current flowing through a primary winding of the power conversion system. The processing information associated with the feedback signal, the reference signal, and the demagnetization signal includes: processing information associated with the feedback signal and the reference signal during a first detection period, the first detection period including a first starting time and a first ending time, the first starting time being at or after a first demagnetization end of the first demagnetization period, determining, during the first detection period, a first number of times that the feedback signal changes from being smaller than the reference signal to being larger than the reference signal in magnitude, and determining whether the first number of times exceeds a predetermined threshold at the first ending time. The outputting a drive signal to a switch configured to affect a current flowing through a primary winding of the power conversion system includes: in response to the first number of times not exceeding the predetermined threshold at the first ending time, outputting the drive signal to cause the switch to open and remain open in order to protect the power conversion system. For example, the method is implemented according to FIG. 8, FIG. 9, and/or FIG. 10.

According to yet another embodiment, a method for protecting a power conversion system includes: receiving a feedback signal, a reference signal, and a demagnetization signal generated based on at least information associated with the feedback signal, processing information associated with the feedback signal, the reference signal, and the demagnetization signal, and generating a protection signal based on at least information associated with the feedback signal, the reference signal, and the demagnetization signal, the demagnetization signal being related to multiple demagnetization periods of the power conversion system, the multiple demagnetization periods including a first demagnetization period and a second demagnetization period. The method further includes: receiving the protection signal, processing information associated with the protection signal, and outputting a drive signal to a switch configured to affect a current flowing through a primary winding of the power conversion system. The processing information associated with the feedback signal, the reference signal, and the demagnetization signal includes: processing information associated with the feedback signal and the reference signal during a first detection period, the first detection period including a first starting time and a first ending time, the first starting time being at or after a first demagnetization end of the first demagnetization period, determining, during the first detection period, a first number of times that the feedback signal changes from being larger than the reference signal to being larger than the reference signal in magnitude, and determining whether the first number of times exceeds a predetermined threshold at the first ending time. The outputting a drive signal to a switch configured to affect a current flowing through a primary winding of the power conversion system includes: in response to the first number of times not exceeding the predetermined threshold at the first ending time, outputting the drive signal to cause the switch to open and remain open in order to protect the power conversion system. For example, the method is implemented according to FIG. 8, FIG. 9, and/or FIG. 10.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for protecting a power conversion system, the system controller comprising:
a protection component configured to receive a feedback signal, a reference signal, and a demagnetization signal generated based at least in part on the feedback signal and to generate a protection signal based at least in part on the feedback signal, the reference signal, and the demagnetization signal, the demagnetization signal being related to multiple demagnetization periods of the power conversion system, the multiple demagnetization periods including a first demagnetization period and a second demagnetization period;
wherein the protection component is further configured to:
process the feedback signal and the reference signal during a first detection period, the first detection period including a first starting time and a first ending time, the first starting time being at or after a first demagnetization end of the first demagnetization period;
determine, during the first detection period, a first number of times that the feedback signal changes from being smaller than the reference signal to being larger than the reference signal in magnitude; and
determine whether the first number of times exceeds a predetermined threshold at the first ending time;
wherein the system controller is configured to, in response to the first number of times not exceeding the predetermined threshold at the first ending time, output a drive signal to cause a switch to open and remain open in order to protect the power conversion system, the switch being configured to affect a current flowing through a primary winding of the power conversion system.

2. The system controller of claim 1 wherein the system controller is further configured to, in response to the first number of times not exceeding the predetermined threshold at the first ending time, output the drive signal to cause the switch to open and remain open until the power conversion system is powered down and restarted.

3. The system controller of claim 1 wherein the system controller is further configured to, in response to the first number of times exceeding the predetermined threshold at the first ending time, output the drive signal to close and open the switch according to one or more modulation frequencies to operate the power conversion system.

4. The system controller of claim 1 wherein the protection component includes:
a comparator configured to receive the feedback signal and the reference signal and generate a comparison signal based at least in part on the feedback signal and the reference signal; and
a processing component configured to receive the comparison signal and output a first processed signal based at least in part on the comparison signal, the first processed signal being related to the first number of times that the feedback signal changes from being smaller than the reference signal to being larger than the reference signal in magnitude.

5. The system controller of claim 4 wherein the processing component is further configured to, in response to the first number of times not exceeding the predetermined threshold, keep the first processed signal at a first logic level.

6. The system controller of claim 5 wherein the processing component is further configured to, in response to the first number of times exceeding the predetermined threshold, change the first processed signal from the first logic level to a second logic level.

7. The system controller of claim 4 wherein the processing component includes:
an OR gate configured to receive the comparison signal and generate an input signal based at least in part on the comparison signal; and
a counter configured to receive the input signal and generate an output signal based at least in part on the input signal, the output signal being related to the first processed signal.

8. The system controller of claim 7 wherein the processing component further includes:
a first NOT gate configured to receive the demagnetization signal and output a second processed signal to the counter based at least in part on the demagnetization signal; and
a second NOT gate configured to receive the output signal and output the first processed signal based at least in part on the output signal.

9. The system controller of claim 8 wherein the counter includes one or more flip-flop components configured to receive the input signal and the second processed signal and generate the output signal based on at least information associated with the input signal and at least in part on the second processed signal.

10. The system controller of claim 7 wherein the OR gate is further configured to receive the first processed signal and generate the input signal based at least in part on the comparison signal and the first processed signal.

11. The system controller of claim 4, further comprising:
a timer configured to generate a timing signal associated with one or more pulses;
a first flip-flop component configured to receive the timing signal and the demagnetization signal and generate a trigger signal based at least in part on the timing signal and the demagnetization signal; and
a trigger configured to receive the trigger signal and generate an output signal based at least in part on the trigger signal.

12. The system controller of claim 11 wherein the timer is further configured to receive the trigger signal.

13. The system controller of claim 11 wherein the protection component is further configured to, if the timing signal is at a logic high level before the first demagnetization end and the timing signal changes from the logic high level to a logic low level in response to the first demagnetization end, determine, during the first detection period, the first number of times that the feedback signal changes from being smaller than the reference signal to being larger than the reference signal in magnitude.

14. The system controller of claim 11 wherein the processing component further includes:
a second flip-flop component configured to:
receive the first processed signal; and
in response to the first number of times not exceeding the predetermined threshold at the first ending time, output the protection signal at a logic level based at least in part on the first processed signal in order to cause the switch to open and remain open in order to protect the power conversion system.

15. The system controller of claim 11 wherein the first ending time is at or before an end of an off-time period including the first demagnetization period.

16. The system controller of claim 15 wherein the switch remains open during the off-time period.

17. The system controller of claim 11 wherein the protection component is further configured to, during a second detection period, process the feedback signal and the reference signal and determine a second number of times that the feedback signal changes from being smaller than the reference signal to being larger than the reference signal in magnitude, the second detection period being separated from the first detection period by one or more switching periods associated with the drive signal.

18. The system controller of claim 17 wherein the second detection period includes a second starting time and a second ending time, the second starting time being at or after a second demagnetization end of the second demagnetization period.

19. The system controller of claim 11, further comprising:
an AND gate configured to receive the protection signal and generate a third processed signal based at least in part on the protection signal; and
a third flip-flop component configured to receive the third processed signal and output a flip-flop signal to a driver based at least in part on the third processed signal.

20. The system controller of claim 1, further comprising a demagnetization detector configured to receive the feedback signal and generate the demagnetization signal based at least in part on the feedback signal.

21. The system controller of claim 1 wherein the second demagnetization period is separated from the first demagnetization period by one or more switching periods associated with the drive signal.

22. A system controller for protecting a power conversion system, the system controller comprising:
a protection component configured to receive a feedback signal, a reference signal, and a demagnetization signal generated based at least in part on the feedback signal and to generate a protection signal based at least in part on the feedback signal, the reference signal, and the demagnetization signal, the demagnetization signal being related to multiple demagnetization periods of the power conversion system, the multiple demagnetization periods including a first demagnetization period and a second demagnetization period;
wherein the protection component is further configured to:
process the feedback signal and the reference signal during a first detection period, the first detection period including a first starting time and a first ending time, the first starting time being at or after a first demagnetization end of the first demagnetization period;
determine, during the first detection period, a first number of times that the feedback signal changes from being larger than the reference signal to being smaller than the reference signal in magnitude; and
determine whether the first number of times exceeds a predetermined threshold at the first ending time;
wherein the system controller is configured to, in response to the first number of times not exceeding the predetermined threshold at the first ending time, output a drive signal to cause a switch to open and remain open in order to protect the power conversion system, the switch being configured to affect a current flowing through a primary winding of the power conversion system.

23. The system controller of claim 22 wherein the system controller is further configured to, in response to the first number of times not exceeding the predetermined threshold at the first ending time, output the drive signal to cause the switch to open and remain open until the power conversion system is powered down and restarted.

24. The system controller of claim 22 wherein the system controller is further configured to, in response to the first number of times exceeding the predetermined threshold at the first ending time, output the drive signal to close and open the switch according to one or more modulation frequencies to operate the power conversion system.

25. The system controller of claim 22 wherein the protection component includes:

a comparator configured to receive the feedback signal and the reference signal and generate a comparison signal based at least in part on the feedback signal and the reference signal; and a processing component configured to receive the comparison signal and output a processed signal based at least in part on the comparison signal, the processed signal being related to the first number of times that the feedback signal changes from being larger than the reference signal to being smaller than the reference signal in magnitude.

26. The system controller of claim 25 wherein the processing component includes:

an OR gate configured to receive the comparison signal and generate an input signal based at least in part on the comparison signal; and a counter configured to receive the input signal and generate an output signal based at least in part on the input signal, the output signal being related to the processed signal.

27. The system controller of claim 26 wherein the OR gate is further configured to receive the processed signal and generate the input signal based at least in part on the comparison signal and the processed signal.

28. The system controller of claim 25 wherein the processing component is further configured to, in response to the first number of times not exceeding the predetermined threshold, keep the processed signal at a first logic level.

29. The system controller of claim 28 wherein the processing component is further configured to, in response to the first number of times exceeding the predetermined threshold, change the processed signal from the first logic level to a second logic level.

30. The system controller of claim 25, further comprising:

a timer configured to generate a timing signal associated with one or more pulses;

a first flip-flop component configured to receive the timing signal and the demagnetization signal and generate a trigger signal based at least in part on the timing signal and the demagnetization signal; and a trigger configured to receive the trigger signal and generate an output signal based at least in part on the trigger signal.

31. The system controller of claim 30 wherein the processing component further includes:

a second flip-flop component configured to:
  receive the processed signal; and
  in response to the first number of times not exceeding the predetermined threshold at the first ending time, output the protection signal at a logic level based at least in part on the processed signal in order to cause the switch to open and remain open in order to protect the power conversion system.

32. The system controller of claim 30 wherein the first ending time is at or before an end of an off-time period including the first demagnetization period.

33. The system controller of claim 32 wherein the switch remains open during the off-time period.

34. The system controller of claim 25 wherein the protection component is further configured to, if the timing signal is at a logic high level before the first demagnetization end and the timing signal changes from the logic high level to a logic low level in response to the first demagnetization end, determine, during the first detection period, the first number of times that the feedback signal changes from being larger than the reference signal to being smaller than the reference signal in magnitude.

35. The system controller of claim 25 wherein the protection component is further configured to, during a second detection period, process the feedback signal and the reference signal and determine a second number of times that the feedback signal changes from being larger than the reference signal to being smaller than the reference signal in magnitude, the second detection period being separated from the first detection period by one or more switching periods associated with the drive signal.

36. The system controller of claim 35 wherein the second detection period includes a second starting time and a second ending time, the second starting time being at or after a second demagnetization end of the second demagnetization period.

37. The system controller of claim 22 wherein the second demagnetization period is separated from the first demagnetization period by one or more switching periods associated with the drive signal.

38. A method for protecting a power conversion system, the method comprising:

receiving a feedback signal, a reference signal, and a demagnetization signal generated based at least in part on the feedback signal;

processing the feedback signal, the reference signal, and the demagnetization signal;

generating a protection signal based at least in part on the feedback signal, the reference signal, and the demagnetization signal, the demagnetization signal being related to multiple demagnetization periods of the power conversion system, the multiple demagnetization periods including a first demagnetization period and a second demagnetization period; and outputting a drive signal;

wherein the processing the feedback signal, the reference signal, and the demagnetization signal includes:
  processing the feedback signal and the reference signal during a detection period, the detection period including a starting time and an ending time, the starting time being at or after a demagnetization end of the first demagnetization period;
  determining, during the detection period, a number of times that the feedback signal changes from being smaller than the reference signal to being larger than the reference signal in magnitude; and
  determining whether the number of times exceeds a predetermined threshold at the ending time;

wherein the outputting a drive signal includes:
  in response to the number of times not exceeding the predetermined threshold at the ending time, outputting the drive signal to cause a switch to open and remain open in order to protect the power conversion system.

39. The method of claim 38 wherein the outputting the drive signal to cause the switch to open and remain open in order to protect the power conversion system includes outputting the drive signal to cause the switch to open and remain open until the power conversion system is powered down and restarted.

40. The method of claim 38, wherein the ending time is at or before an end of an off-time period including the first demagnetization period.

41. The method of claim 40, wherein the switch remains open during the off-time period.

42. A method for protecting a power conversion system, the method comprising:

receiving a feedback signal, a reference signal, and a demagnetization signal generated based at least in part on the feedback signal;

processing the feedback signal, the reference signal, and the demagnetization signal;

generating a protection signal based at least in part on the feedback signal, the reference signal, and the demagnetization signal, the demagnetization signal being related to multiple demagnetization periods of the power conversion system, the multiple demagnetization periods including a first demagnetization period and a second demagnetization period; and outputting a drive signal;

wherein the processing the feedback signal, the reference signal, and the demagnetization signal includes:

processing the feedback signal and the reference signal during a detection period, the detection period including a starting time and an ending time, the starting time being at or after a demagnetization end of the first demagnetization period;

determining, during the detection period, a number of times that the feedback signal changes from being larger than the reference signal to being smaller than the reference signal in magnitude; and determining whether the number of times exceeds a predetermined threshold at the ending time;

wherein the outputting a drive signal includes:

in response to the number of times not exceeding the predetermined threshold at the ending time, outputting the drive signal to cause a switch to open and remain open in order to protect the power conversion system.

43. The method of claim 42 wherein the outputting the drive signal to cause the switch to open and remain open in order to protect the power conversion system includes outputting the drive signal to cause the switch to open and remain open until the power conversion system is powered down and restarted.

44. The method of claim 42, wherein the ending time is at or before an end of an off-time period including the first demagnetization period.

45. The method of claim 44, wherein the switch remains open during the off-time period.

* * * * *